United States Patent
Alanqar et al.

(10) Patent No.: US 10,684,598 B1
(45) Date of Patent: Jun. 16, 2020

(54) BUILDING MANAGEMENT SYSTEM WITH EFFICIENT MODEL GENERATION FOR SYSTEM IDENTIFICATION

(71) Applicant: Johnson Controls Technology Company, Auburn Hills, MI (US)

(72) Inventors: Anas W. I. Alanqar, Milwaukee, WI (US); Matthew J. Ellis, Milwaukee, WI (US); Michael J. Wenzel, Grafton, WI (US); Juan Esteban Tapiero Bernal, Wauwatosa, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/240,028

(22) Filed: Jan. 4, 2019

(51) Int. Cl.
*G06Q 10/04* (2012.01)
*G05B 15/02* (2006.01)
*G05B 23/02* (2006.01)

(52) U.S. Cl.
CPC ......... *G05B 15/02* (2013.01); *G05B 23/0235* (2013.01); *G06Q 10/04* (2013.01); *G05B 2219/2642* (2013.01)

(58) Field of Classification Search
CPC ...................................................... G06Q 10/04
See application file for complete search history.

(56) References Cited

U.S. PATENT DOCUMENTS

| 2018/0374104 A1* | 12/2018 | Meusel ................... G05B 17/02 |
| 2019/0340684 A1* | 11/2019 | Belanger ................ G06N 7/005 |
| 2020/0011687 A1* | 1/2020 | Lindemann .............. G07C 5/02 |

OTHER PUBLICATIONS

U.S. Appl. No. 15/900,459, filed Feb. 20, 2018, Johnson Controls Technology Company.
U.S. Appl. No. 15/953,324, filed Apr. 13, 2018, Johnson Controls Technology Company.

* cited by examiner

*Primary Examiner* — Mark A Connolly
(74) *Attorney, Agent, or Firm* — Foley & Lardner LLP

(57) ABSTRACT

A building management system includes building equipment operable generate training data relating to behavior of a building system and a controller configured to perform a system identification process that includes generating a prediction error function based on the training data and a system model, generating initial guesses of one or more parameters of the system model, running an optimization problem of the prediction error function for a first group of iterations, discarding, after the first group of iterations, a portion of the initial guesses based on one or more criteria and ranking a remaining portion of the initial guesses, running the optimization problem of the prediction error function for a top-ranked initial guess of the remaining portion to local optimality to identify a first set of values of the one or more parameters, and identifying the one or more parameters as having the first set of values.

20 Claims, 14 Drawing Sheets

BUILDING MANAGEMENT SYSTEM WITH EFFICIENT MODEL GENERATION FOR SYSTEM IDENTIFICATION

BACKGROUND

The present disclosure relates generally to control systems for HVAC equipment, and more particularly to system identification for controlling HVAC equipment. System identification refers to the process of generating a model of a system (e.g., a building served by an HVAC equipment) that can be used to control the HVAC equipment, for example in a model predictive control system. Because the physical phenomena that govern such systems are often complex, nonlinear, and poorly understood, system identification requires the determination of model parameters based on measured and recorded data from the real system in order to generate an accurate predictive model.

SUMMARY

One implementation of the present disclosure is a building management system. The building management system includes building equipment operable to heat or cool a building and generate training data relating to behavior of a building system and a controller configured to perform a system identification process to identify one or more parameters of a system model that predicts the behavior of the building system. The one or more parameters includes at least one of one or more model parameters or one or more Kalman gain parameters. The system identification process includes generating a prediction error function based on the training data and the system model, generating a plurality of initial guesses of the one or more parameters, for each initial guess, running an optimization problem of the prediction error function for a first group of iterations, discarding, after the first group of iterations, a portion of the initial guesses based on one or more criteria and ranking a remaining portion of the initial guesses, running the optimization problem of the prediction error function for a top-ranked initial guess of the remaining portion to local optimality or for a second group of iterations to identify a first set of values of the one or more parameters, determining whether the first set of values of the one or more parameters satisfies a condition, and, in response to a determination that the first set of values satisfies the condition, identifying the one or more parameters as having the first set of values. The controller is configured to operate the building equipment to heat or cool the building by performing a predictive control process that uses the system model with the one or more parameters identified by the system identification process.

In some embodiments, the controller is further configured to, in response to determining that the first set of values does not satisfy the condition, discard the top-ranked initial guess, run the optimization problem for a new top-ranked initial guess to local optimality or for the second group of iterations to identify a second set of values of the one or more parameters, determine whether the second set of values satisfies the condition, and, in response to a determination that the second set of values satisfies the condition, select the second set of values for the one or more parameters.

In some embodiments, the controller is configured to discard initial guesses that violate physical laws relating to the one or more parameters. In some embodiments, determining that the first set of values satisfies the condition includes determining that the first set of values conforms with the physical laws relating to the one or more parameters.

In some embodiments, the controller is configured to discard the portion of the initial guesses based on one or more criteria by determining that a first initial guess and a second initial guess lead toward a same local optimum after the first group of iterations and, in response, discarding first initial guess.

In some embodiments, the controller is configured to discard the portion of the initial guesses based on one or more criteria by discarding initial guesses that lead to an unstable, uncontrollable, or unobservable system after the first group of iterations.

In some embodiments, the controller is configured to discard the portion of the initial guesses based on one or more criteria by discarding initial guesses that lead to a matrix with a condition number greater than a threshold number.

In some embodiments, each of the plurality of initial guesses provides a stable system. In some embodiments, the controller is configured to detect and remove saturation data from the training data. In some embodiments, the prediction error function includes a multi-step ahead prediction error function.

Another implementation of the present disclosure is a method for generating a system model for a building system and controlling building equipment in accordance with the system model. The method includes operating the building equipment to generate training data relating to behavior of the building system, defining a prediction error function based on the training data and the system model, and identifying values for one or more parameters of the system model by optimizing the prediction error function. Optimizing the prediction error function includes generating a plurality of initial guesses of the one or more parameters, running, for each initial guess, an optimization problem of the prediction error function for a first group of iterations, discarding, after the first group of iterations, a portion of the initial guesses based on one or more criteria and ranking a remaining portion of the initial guesses, running the optimization problem of the prediction error function for a top-ranked initial guess of the remaining portion to local optimality or for a second group of iterations to identify a first set of values of the one or more parameters, determining whether the first set of values of the one or more parameters satisfies a condition, and, in response to a determination that the first set of values satisfies the condition, defining the one or more parameters as having the first set of values. The method also includes operating the building equipment to heat or cool the building system by applying the system model in a predictive controller to generate control inputs for the building equipment.

In some embodiments, the method also includes, in response to determining that the first set of values does not satisfy the condition, discarding the top-ranked initial guess, running the optimization problem of the prediction error function for a new top-ranked initial guess to local optimality or for the second group of iterations to identify a second set of values of the one or more parameters, determining whether the second set of values satisfies the condition, and, in response to a determination that the second set of values satisfies the condition, selecting the second set of values for the one or more parameters.

In some embodiments, the method includes discarding initial guesses that violate physical laws relating to the one or more parameters and the behavior of the building system.

In some embodiments, determining that the first set of values satisfies the condition includes determining that the first set of values conforms with the physical laws.

In some embodiments, discarding the portion of the initial guesses based on one or more criteria includes determining that a first initial guess and a second initial guess lead toward a same local optimum after the first group of iterations and, in response, discarding the first initial guess.

In some embodiments, discarding the portion of the initial guesses based on one or more criteria includes discarding initial guesses that lead to a matrix with a condition number greater than a threshold number after the first group of iterations. In some embodiments, each of the plurality of initial guesses provides a stable system. In some embodiments, the method includes detecting and removing saturation data from the training data. In some embodiments, the prediction error function includes a multi-step ahead prediction error function.

Another implementation of the present disclosure is a method for generating a system model for a building and controlling building equipment in accordance with the system model. The method includes operating the building equipment to generate training data relating to behavior of the building system, and defining a prediction error function based on the training data and the system model. The method also includes identifying values for one or more parameters of the system model based on the prediction error function by generating a plurality of initial guesses of the one or more parameters, for each initial guess, performing a first group of iterations using the prediction error function, after the first group of iterations, discarding a portion of the initial guesses based on one or more criteria and ranking a remaining portion of the initial guesses, performing a second group of iterations using the prediction error function for a top-ranked initial guess of the remaining portion to identify a first set of values of the one or more parameters, determining whether the first set of values of the one or more parameters satisfies a condition; and in response to a determination that the first set of values satisfies the condition, defining the one or more parameters as having the first set of values. The method also includes operating the building equipment to heat or cool the building system by applying the system model in a predictive controller to generate control inputs for the building equipment.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, systems and methods for system identification using a multi-step ahead prediction error approach for use in controlling plant equipment are shown and described. The systems and method described herein provide improved system models and therefore improved control of plant equipment for heating and cooling buildings or for other plant functions.

Building HVAC Systems

Figure 1:
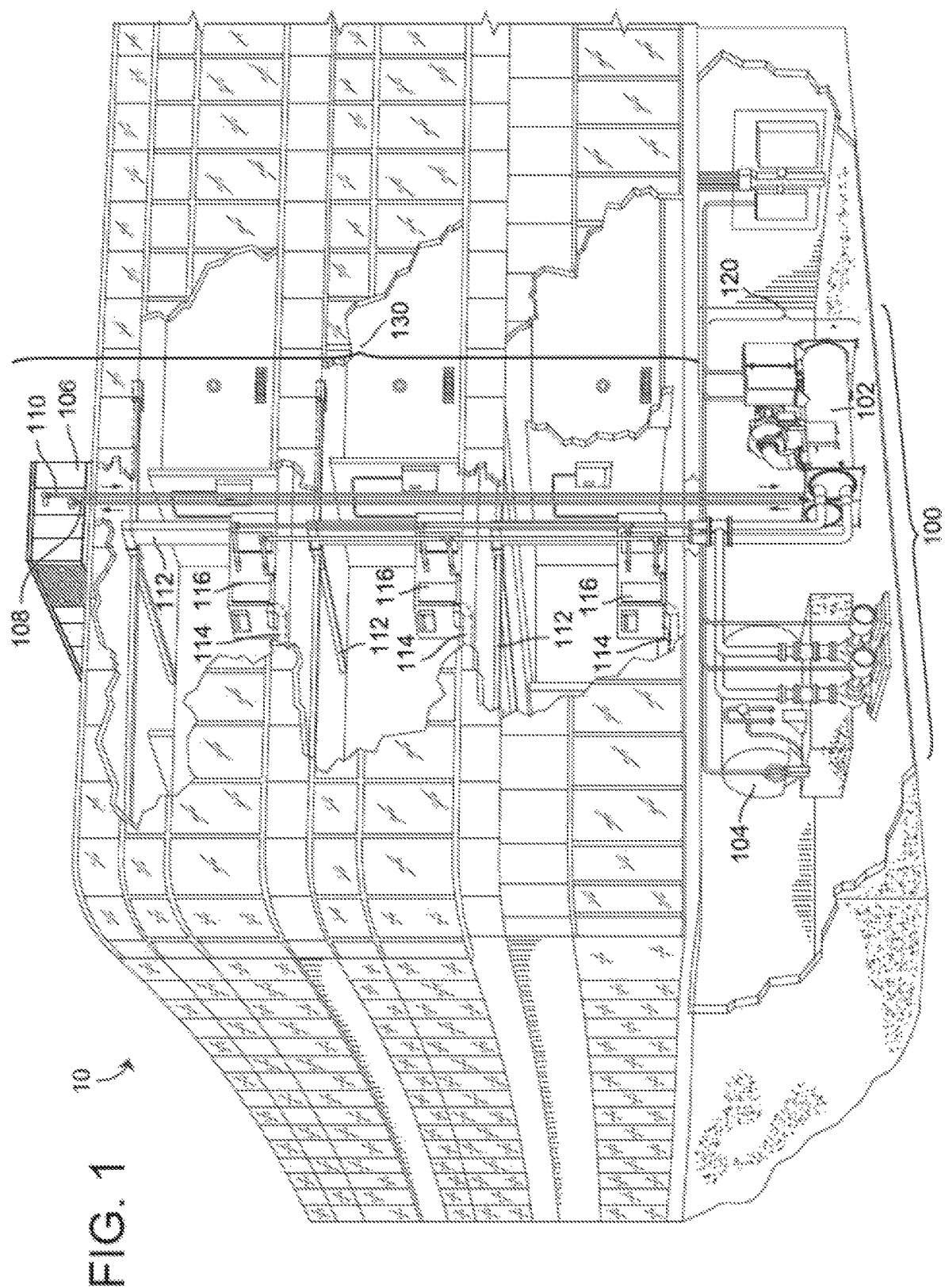
FIG. 1 is a drawing of a building equipped with a HVAC system, according to an exemplary embodiment.

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
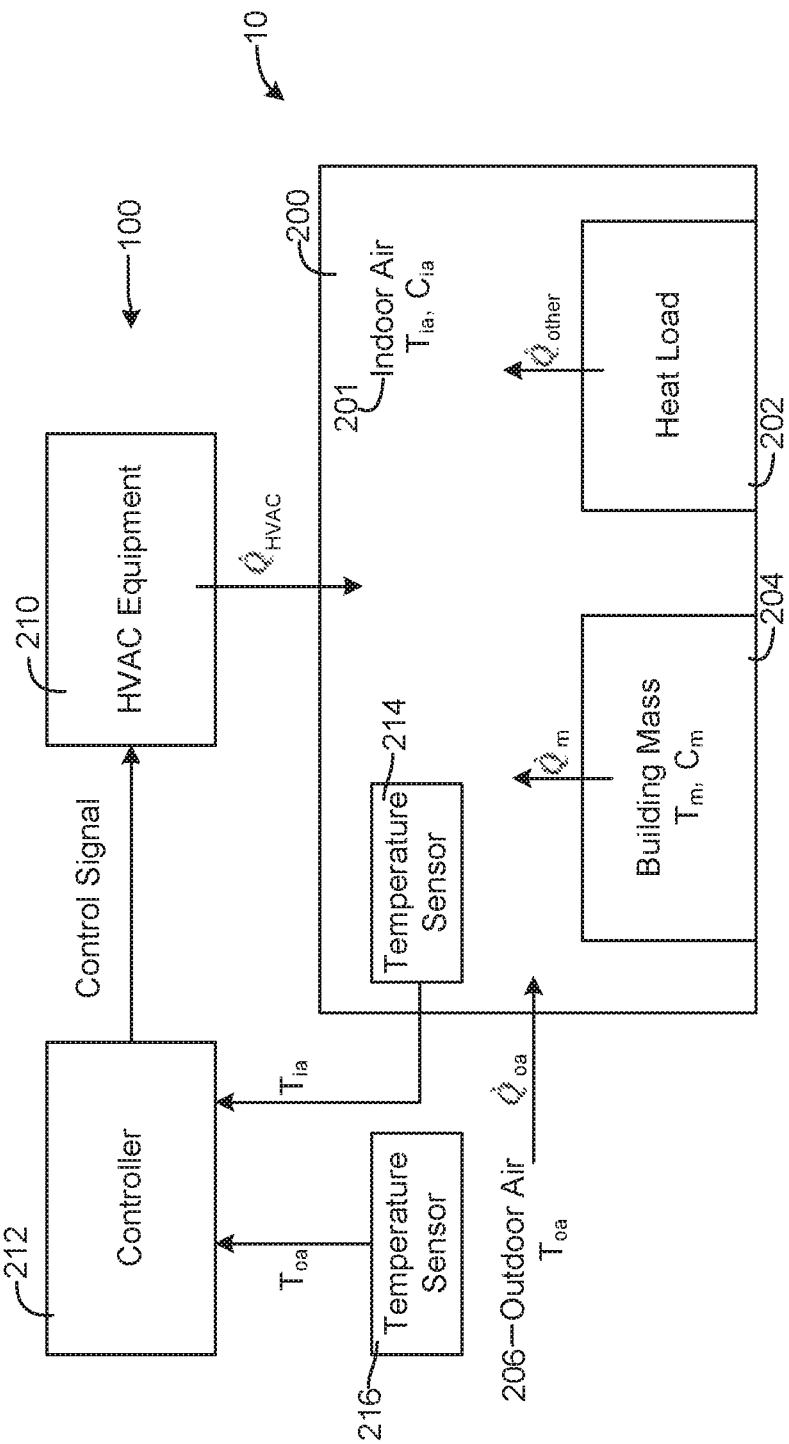
FIG. 2 is a block diagram of the building and HVAC system of FIG. 1, according to an exemplary embodiment.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ in the zone 200 at or around a desired temperature to facilitate the comfort of occupants of the zone 200 or to meet other needs of the zone 200.

As shown in FIG. 2, the indoor air temperature $T_{ia}$ of the zone 200 has a thermal capacitance $C_{ia}$. The indoor air temperature $T_{ia}$ is affected by a variety of heat transfers $\dot{Q}$ into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$ to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of $\dot{Q}_{HVAC}$) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of $T_{ia}$ to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{I,j}\int_0^t \varepsilon_{sp}(s)ds \qquad \text{(Eq. A)}$$

$$\varepsilon_{sp} = T_{sp,j} - T_{ia} \qquad \text{(Eq. B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
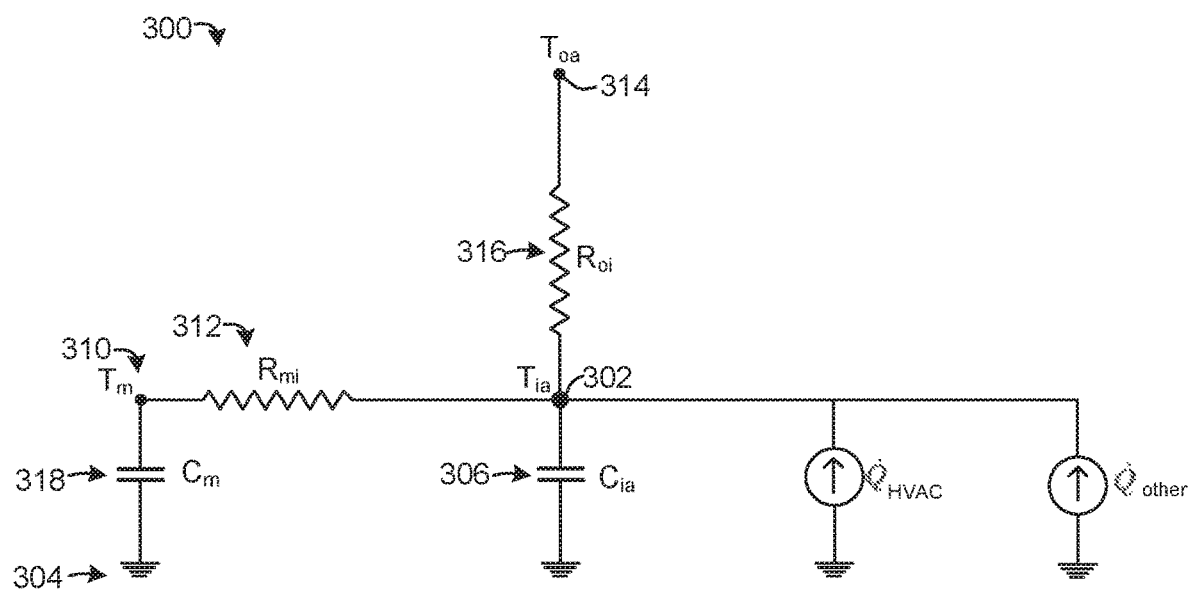
FIG. 3 is a circuit-style diagram of a model of the building and HVAC system of FIG. 1, according to an exemplary embodiment.

Referring now to FIG. 3, a circuit-style diagram 300 corresponding to the zone 200 and the various heat transfers $\dot{Q}$ of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \qquad \text{(Eq. C)}$$

$$C_m\dot{T}_m = \frac{1}{R_{mi}}(T_{ia} - T_m) \qquad \text{(Eq. D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia}\dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second nonlinear differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term $$\frac{1}{R_{mi}}(T_{ia} - T_m)$$

is included on the right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{P,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} + \qquad \text{(Eq. E)}$$

$$\begin{bmatrix} -\frac{K_{P,j}}{C_{ia}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} 0 \\ \frac{1}{C_{ia}} \\ 0 \end{bmatrix} \dot{Q}_{other};$$

$$\begin{bmatrix} T_{ia} \\ \dot{Q}_{HVAC,j} \end{bmatrix} = \begin{bmatrix} 1 & 0 & 0 \\ -K_{P,j} & 0 & K_{I,j} \end{bmatrix} \begin{bmatrix} T_{ia} \\ T_m \\ I \end{bmatrix} + \begin{bmatrix} 0 & 0 \\ K_{P,j} & 0 \end{bmatrix} \begin{bmatrix} T_{sp,j} \\ T_{oa} \end{bmatrix}; \qquad \text{(Eq. F)}$$

where I represents the integral term $$\int_0^t \varepsilon_{sp}(s)ds$$

from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the controller 212 models the disturbance $\dot{Q}_{other}$ using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}$$

where $$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix}, B_c(\theta) = \begin{bmatrix} \theta_3\theta_4 & \theta_1 \\ 0 & 0 \\ 1 & 0 \end{bmatrix},$$

$$C_c(\theta) = \begin{bmatrix} 1 & 0 & 0 \\ -\theta_4 & 0 & \theta_5\theta_4 \end{bmatrix}, D_c(\theta) = \begin{bmatrix} 0 & 0 \\ \theta_4 & 0 \end{bmatrix}; \theta_1 = \frac{1}{C_{ia}R_{oi}};$$

$$\theta_2 = \frac{1}{C_{ia}R_{mi}}; \theta_3 = \frac{1}{C_{ia}}; \theta_4 = K_p; \theta_5 = \frac{1}{\tau}; \theta_6 = \frac{1}{C_mR_{mi}}; \text{ and}$$

$$\dot{x}(t) = \begin{bmatrix} \dot{T}_{ia} \\ \dot{T}_m \\ \dot{I} \end{bmatrix}; x(t) = \begin{bmatrix} T_{ia} \\ T_m \\ I \end{bmatrix}; u(t) = \begin{bmatrix} T_{spj} \\ T_{oa} \end{bmatrix}.$$

As described in detail below, the controller 212 uses a two-step process to parameterize the system. In the first step, the controller 212 identifies the system parameters $\theta = \{\theta_1, \theta_2, \theta_3, \theta_4, \theta_5, \theta_6\}$ (i.e., the values of $C_{ia}$, $C_m$, $R_{mi}$, $R_{oi}$, $K_{p,j}$, $K_{i,j}$). The disturbance state d is then introduced into the model and an Kalman estimator gain is added, such that in the second step the controller 212 identifies the Kalman gain parameters K.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
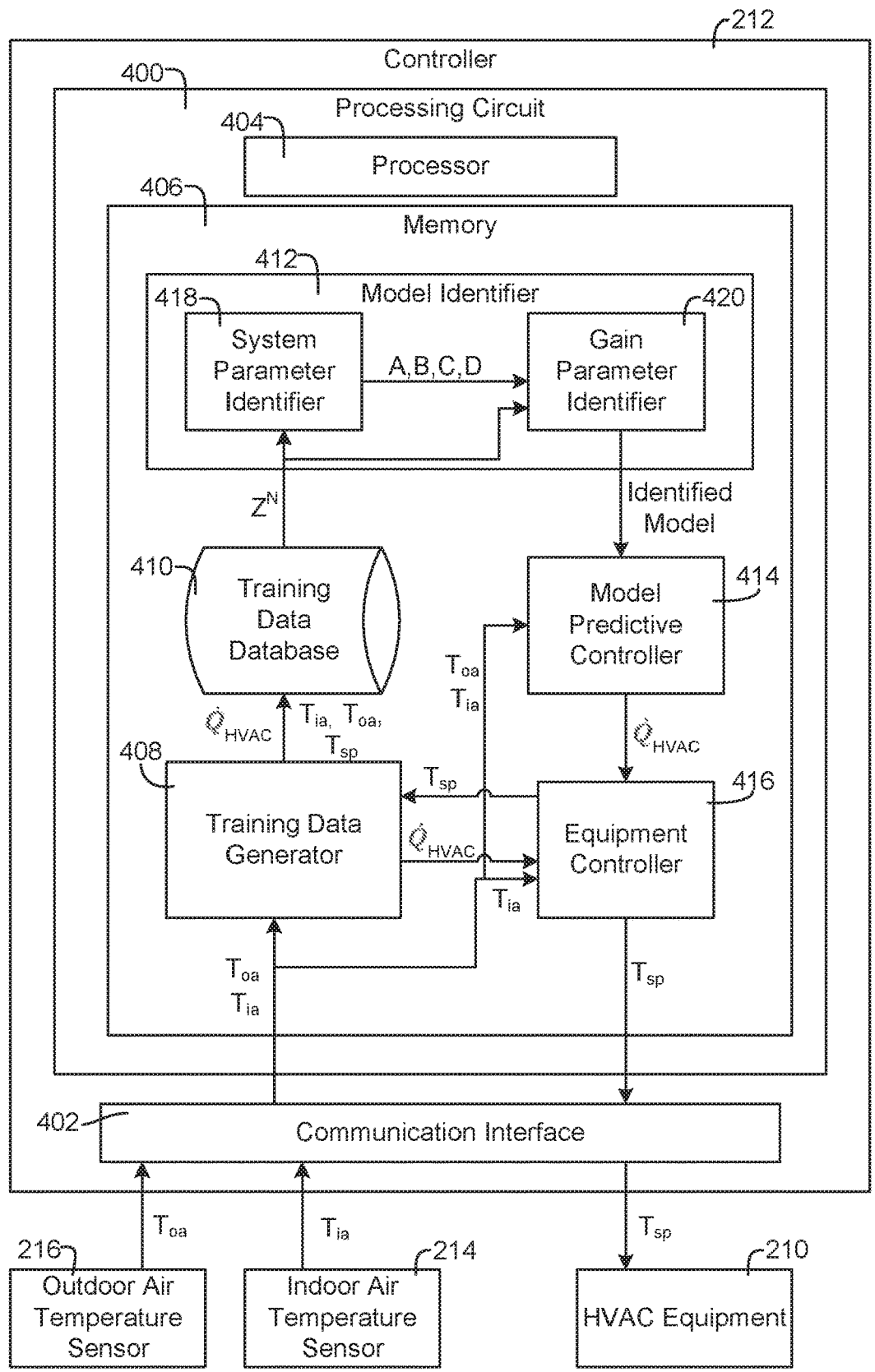
FIG. 4 is a block diagram of a controller for use with the HVAC system of FIG. 1, according to an exemplary embodiment.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements $T_{oa}$ and $T_{ia}$ to be received by the processing circuit 400. The communication interface 402 also facilitates communication between the processing circuit 400 and the HVAC equipment 210 that allows a control signal (indicated as temperature setpoint $T_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a model identifier 412, a model predictive controller 414, and an equipment controller 416. The various generators, databases, identifiers, controllers, optimizers, etc. of memory 406 may be implemented as any combination of hardware components and machine-readable media included with memory 406.

The equipment controller 416 is configured to generate a temperature setpoint $T_{sp}$ that serves as a control signal for the HVAC equipment 210. The equipment controller receives inputs of the indoor air temperature $T_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 416 then provides the control signal $T_{sp}$ to the HVAC equipment 210 via the communication interface 402.

The model predictive controller 414 determines $\dot{Q}_{HVAC}$ based on an identified model and the temperature measurements $T_{ia}$, $T_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. That is, the training data generator provides various $\dot{Q}_{HVAC}$ values to the equipment controller 416 for a number N of time steps k, and receives the measured output response of the indoor air temperature $T_{ia}$ at each time step k from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.).

The equipment controller 416 receives the various $\dot{Q}_{HVAC}$ values and generates various control inputs $T_{sp}$ in response. The temperature setpoint $T_{sp}$ for each time step k is provided to the HVAC equipment 210, which operates accordingly to heat or cool the zone 200 (i.e., to influence $T_{ia}$). The temperature setpoints $T_{sp}$ may also be provided to the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq. F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k=0, ..., N, or, more specifically, $T_{sp}(k)$, $T_{oa}(k)$, $T_{ia}(k)$, and $\dot{Q}_{HVAC}(k)$, for k, k=0, ..., N. This data is grouped together in the training data database 410 in a set of training data $Z^N$. In the notation of Eq. G and Eq. H, $Z^N$=[y(1), u(1), y(2), u(2), ..., y(N), u(N)].

In some embodiments, the training data is refined using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
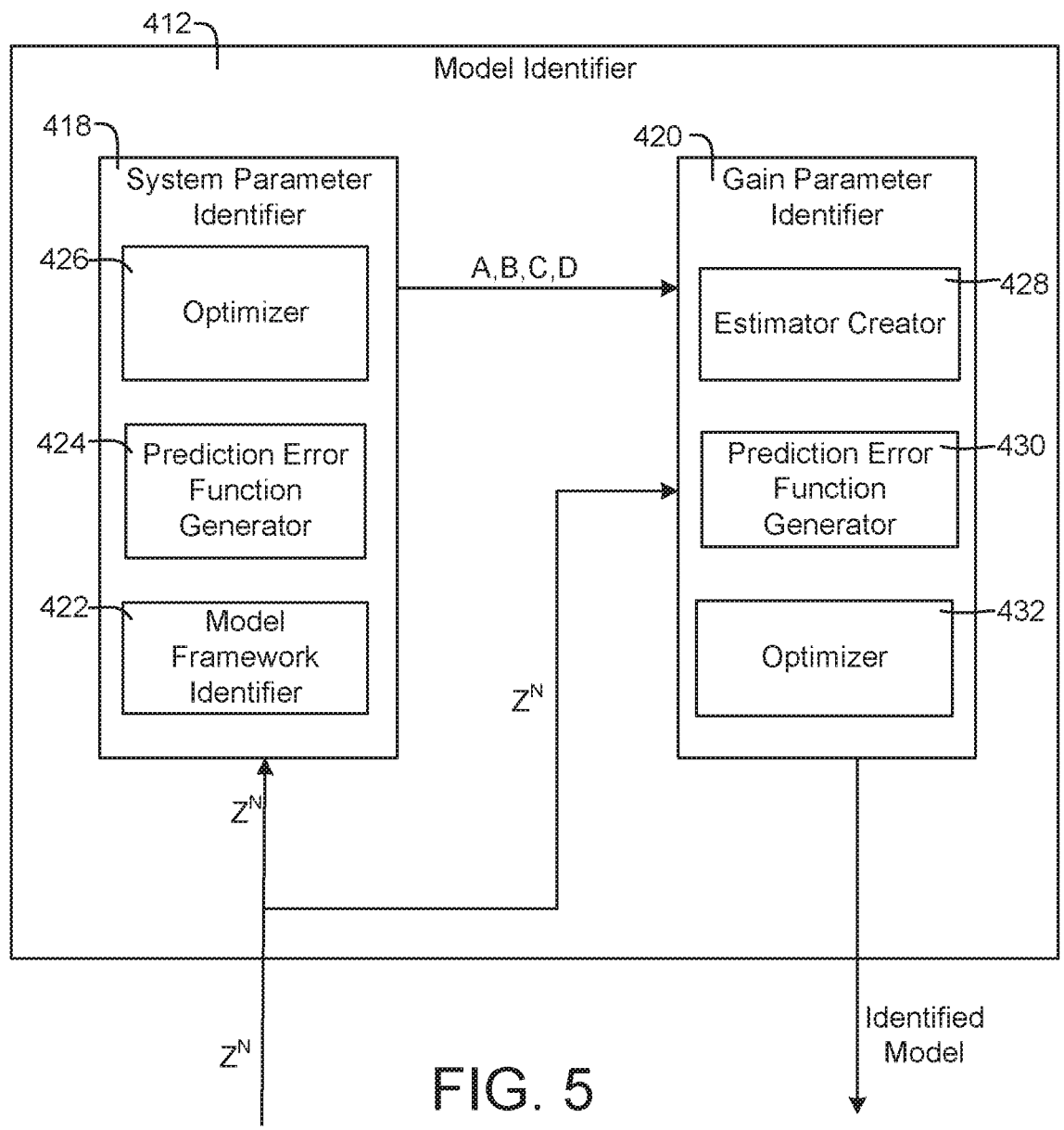
FIG. 5 is a detailed block diagram of a model identifier of the controller of FIG. 4, according to an exemplary embodiment.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta=\{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$, and $K_{i,j}$.

The system parameter identifier 418 includes a model framework identifier 422, a prediction error function generator 424, and an optimizer 426. The model framework identifier 422 identifies that the model of the system, denoted as $\mathcal{M}(\theta)$, corresponds to the form described above in Eqs. G and H, i.e., $$\dot{x}(t)=A_c(\theta)x(t)+B_c(\theta)u(t); \quad (Eq.\ G)$$

$$y(t)=C_c(\theta)x(t)+D_c(\theta)u(t); \quad (Eq.\ H).$$

The model framework identifier 422 thereby determines that the system parameter identifier 418 has the goal of determining a parameter vector $\hat{\theta}_N$ from the set of $\theta \in D\mathcal{M} \subset \mathbb{R}^d$, where $D\mathcal{M}$ is the set of admissible model parameter values. The resulting possible models are given by the set: $M=\{\mathcal{M}(\theta), \theta \in D\mathcal{M}\}$. The goal of the system parameter identifier 418 is to select a parameter vector $\hat{\theta}_N$ from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}_{HVAC}(k)$, for k, k=0, ..., N) into the notation of Eq. G-H as input/output data $Z^N$=[y(1), u(1), y(2), u(2), ..., y(N), u(N)].

The prediction error function generator 424 receives the model framework $M=\{\mathcal{M}(\theta), \theta \in D\mathcal{M}\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N=\hat{\theta}_N(Z^N)=\arg\min_{\theta \in D}\mathcal{M}\ V_N(\theta,Z^N).$$

The prediction error function generator 424 use one or more of several possible prediction error approaches to generate a prediction performance function $V_N(\theta, Z^N)$. In the embodiment shown, the prediction error function generator 424 applies a simulation approach. In the simulation approach, the prediction error function generator 424 uses the model $\mathcal{M}(\theta)$, the input trajectory [u(1), u(2), ..., u(N)], and an initial state x(0) to produce predicted outputs in terms of $\theta$. That is, the prediction error function generator 424 predicts:

$$[\hat{y}(1|0,\theta), \hat{y}(2|0,\theta) \ldots \hat{y}(k|0,\theta) \ldots, \hat{y}(N|0,\theta)],$$

where $\hat{y}(k|0, \theta)$ denotes the predicted output at time step k given the training data from time 0 and the model $\mathcal{M}(\theta)$. The prediction error function generator 424 then calculates a prediction error at each time step k is given by $\varepsilon(k, \theta):=y(k)-\hat{y}(k|0, \theta)$. The prediction error function generator 424 then squares the two-norm of each prediction error $\varepsilon(k,$ θ) and sums the results to determine the prediction performance function, which can be written as:

$$V_N(\theta, Z^N) = \sum_{k=1}^{N} \|y(k) - \hat{y}(k \mid 0, \theta)\|_2^2. \qquad \text{(Eq. I)}$$

In an alternative embodiment, the prediction error function generator 424 applies a one-step-ahead prediction error method to generate the prediction performance function $V_N(\theta, Z^N)$. In the one-step-ahead prediction error method, the prediction error function generator 424 uses past input-output data and the model $\mathcal{M}(\theta)$ the model to predict the output one step ahead in terms of θ. That is, in the one-step ahead prediction error method, the prediction error function generator 424 generates one-step ahead predictions ŷ(k|k−1, θ), which denotes the predicted output at time step k given the past input-output sequence $Z^{k-1}$ and using parameters θ. The one-step ahead prediction ŷ(k|k−1, θ) is then compared to the measured output y(k) by the prediction error function generator 424 to determine the prediction error at k, defined as ε(k, θ):=y(k)−ŷ(k|k−1, θ). The prediction error function generator 424 then squares the two-norm of the prediction errors for each k and sums the results, generating a prediction performance function that can be expressed in a condensed form as:

$$V_N(\theta, Z^N) = \frac{1}{N}\sum_{k=1}^{N} \|y(k) - \hat{y}(k \mid k - 1, \theta)\|_2^2. \qquad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7-8. The multi-step ahead prediction error approach is also described in detail in U.S. patent application Ser. No. 15/953,324, filed Apr. 13, 2018, incorporated by reference herein in its entirety.

The prediction error function generator 424 then provides the performance function $V_N(\theta, Z^N)$ (i.e., from Eq. I or Eq. J in various embodiments) to the optimizer 426.

The optimizer 426 receives the prediction error function generated by the prediction error function generator 424 and optimizes the prediction error function in θ to determine $\hat{\theta}_N$. More specifically, the optimizer 426 finds the minimum value of the prediction error function $V_N(\theta, Z^N)$ as θ is varied throughout the allowable values of θ ε D$\mathcal{M}$. That is, the optimizer 426 determines $\hat{\theta}_N$ based on:

$$\hat{\theta}_N = \hat{\theta}_N(Z^N) = \arg\min_{\theta \in D}\mathcal{M}\, V_N(\theta, Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\dot{Q}_{other}$ on the system. The estimator creator 428 generates an augmented model with disturbance state d, given by:

$$\begin{bmatrix} \dot{x}(t) \\ \dot{d}(t) \end{bmatrix} = \begin{bmatrix} A_c & B_d \\ 0 & 0 \end{bmatrix}\begin{bmatrix} x(t) \\ d(t) \end{bmatrix} + \begin{bmatrix} B_c \\ 0 \end{bmatrix}u(t);$$

$$y(t) = \begin{bmatrix} C_c & C_d \end{bmatrix}\begin{bmatrix} x(t) \\ d(t) \end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{C_{ia}}$$

and $C_d$=0.

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain, resulting in the following model:

$$\begin{bmatrix} \hat{x}(t+1 \mid t) \\ \hat{d}(t+1 \mid t) \end{bmatrix} = \begin{bmatrix} A_{dis} & B_{d_{dis}} \\ 0 & I \end{bmatrix}\begin{bmatrix} \hat{x}(t \mid t-1) \\ \hat{d}(t \mid t-1) \end{bmatrix} + \begin{bmatrix} B_{dis} \\ 0 \end{bmatrix}u(t) + \qquad \text{(Eq. K)}$$

$$\underbrace{\begin{bmatrix} K_x(\phi) \\ K_d(\phi) \end{bmatrix}}_{=:K(\phi)}(y(t) - \hat{y}(t \mid t-1);$$

$$\hat{y}(t \mid t-1) = \begin{bmatrix} C_{dis} & 0 \end{bmatrix}\begin{bmatrix} \hat{x}(t \mid t-1) \\ \hat{d}(t \mid t-1) \end{bmatrix} + D_{dis}u(t). \qquad \text{(Eq. L)}$$

The matrix K(φ) is the estimator gain parameterized with the parameter vector φ where:

$$K_x(\phi) = \begin{bmatrix} \phi_1 & \phi_2 \\ \phi_3 & \phi_4 \\ \phi_5 & \phi_6 \end{bmatrix};$$

$$K_d(\phi) = \begin{bmatrix} \phi_7 & \phi_8 \end{bmatrix}.$$

In this notation, x̂(t+1|t) is an estimate of the state at time t+1 obtained using the Kalman filter and made utilizing information at sampling time t. For example, with a sampling time of five minutes, x̂(t+1|t) is an estimate of the state five minutes after the collection of the data that the estimate is based on. The goal of the gain parameter identifier is to identify parameters $\hat{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7:
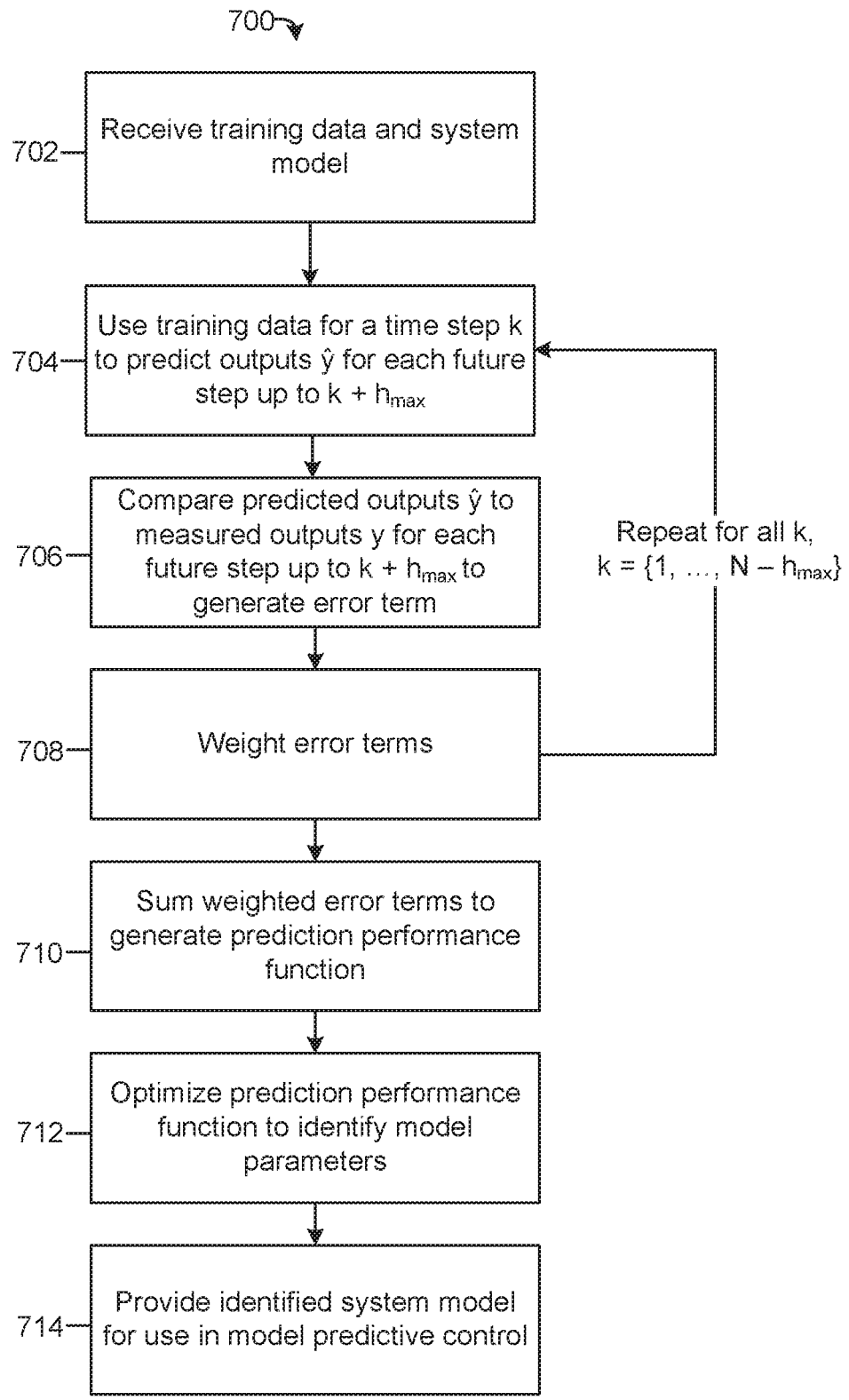
FIG. 7 is a flowchart of a multi-step ahead prediction error method for use in system identification, according to an exemplary embodiment.
Figure 8:
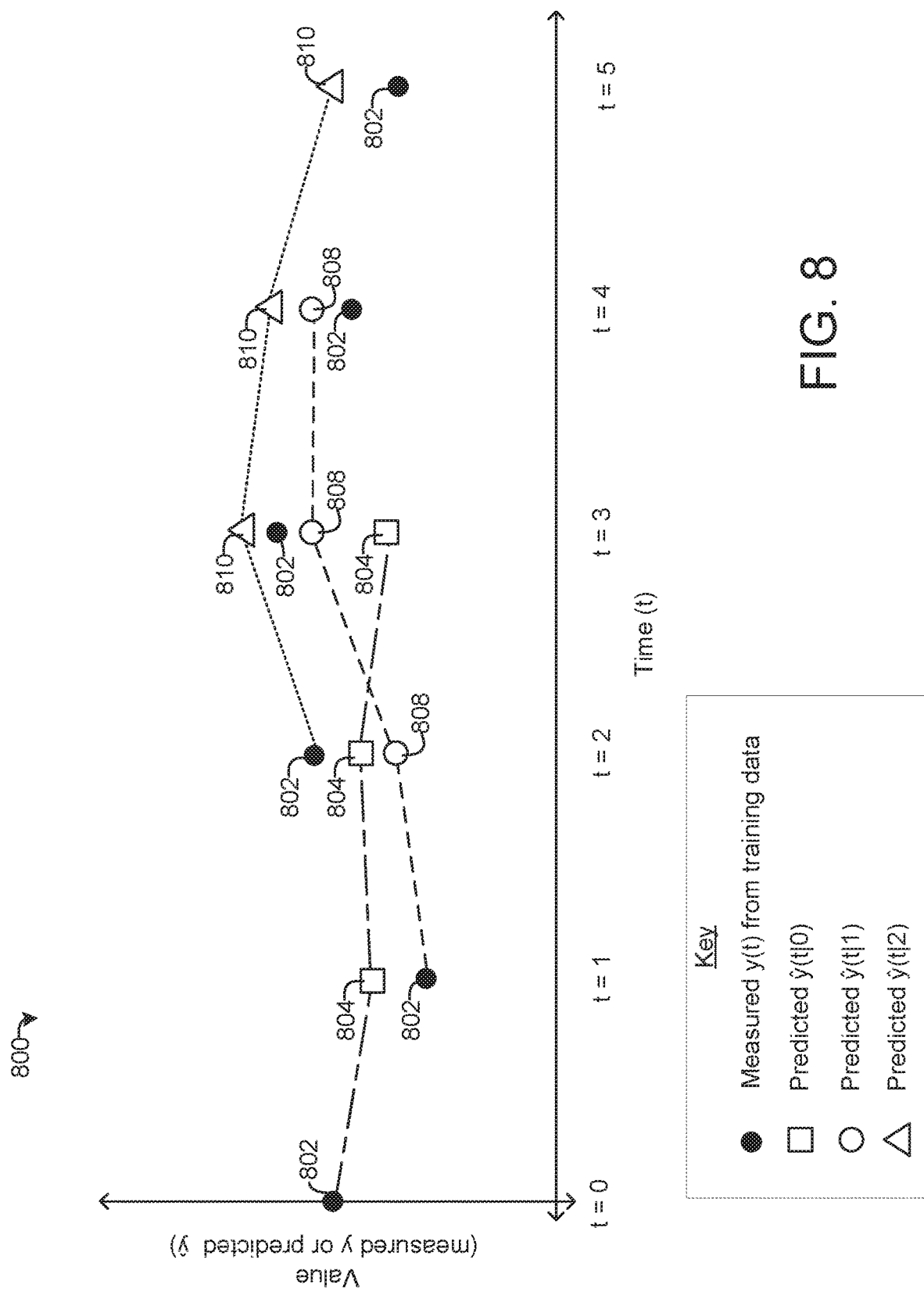
FIG. 8 is a visualization useful in illustrating the multi-step ahead prediction error method of FIG. 7, according to an exemplary embodiment.

The prediction error function generator 430 follows a multi-step ahead prediction error method to generate a predication performance function $V_N(\phi, Z^N)$. The multi-step ahead prediction error method is illustrated in FIGS. 7-8 and described in detail with reference thereto. As an overview, in the multi-step-ahead prediction error method, the prediction error function generator 430 uses past input-output data and the model $\mathcal{M}(\theta)$ the model to predict the output multiple step ahead in terms of $\phi$. That is, in the multi-step ahead prediction error method, the prediction error function generator 430 generates multi-step ahead predictions $\hat{y}(k+h|k-1, \phi)$, which denotes the predicted output at time step $k+h$ given the past input-output sequence $Z^{k-1}$ and using parameters $\phi$. The index h corresponds the number of steps ahead the prediction is made, and for each time step k predictions are made for $h=0, \ldots, h_{max}$ (i.e., when h=2, the prediction is three steps ahead because h is indexed from zero).

Each multiple multi-step ahead prediction $\hat{y}(k+h|k-1, \phi)$ is then compared to the corresponding measured output y(k) by the prediction error function generator 430 to determine the prediction error at k, defined as $\varepsilon(k, \theta) := y(k) - \hat{y}(k+h|k-1, \phi)$. The prediction error function generator 430 then squares the two-norm of the prediction errors for each k and sums the results, in some embodiments using an weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h) \|y(k+h) - \hat{y}(k+h|k-1, \phi)\|_2^2. \quad \text{(Eq. M)}$$

The multi-step ahead prediction error method is described in more detail below with reference to FIGS. 7-8. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in $\phi$ to determine $\hat{\phi}_N$. More specifically, the optimizer 426 finds the minimum value of the prediction error function $V_N(\phi, Z^N)$ as $\phi$ is varied throughout the allowable values of $\phi$. In some cases, all real values of $\phi$ are allowable. That is, the optimizer 426 determines $\hat{\phi}_N$ based on:

$$\hat{\phi}_N = \hat{\phi}_N(Z^N) = \arg\min_\phi V_N(\phi, Z^N).$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

$$x(k+1) = Ax(k) + Bu(k);$$

$$y(k) = Cx(k) + Du(k).$$

where the one-step prediction of $\hat{x}(k+1|k)$ using a steady-state Kalman gain is:

$$\hat{x}(k+1|k) = A\hat{x}(k|k-1) + Bu(k) + K(y(k) - C\hat{x}(k|k-1) - Du(k));$$

$$\hat{y}(k|k-1) = C\hat{x}(k|k-1) + Du(k).$$

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}=3$. The one-step prediction (with the prediction error function generator 430 given x0) is given by the equation:

$$\hat{x}(1|0) = Ax0 + Bu(0) + K(y(0) - Cx0 - Du(0));$$

$$\hat{y}(0|0) = Cx0 + Du(0).$$

The prediction of the second step is $$\hat{x}(2|0) = A\hat{x}(1|0) + Bu(1) = A(Ax0 + Bu(0) + K(y(0) - Cx0 - Du(0))) + Bu(1);$$

$$\hat{y}(1|0) = C\hat{x}(1|0) + Du(1) = C(Ax0 + Bu(0) + K(y(0) - Cx0 - Du(0))) + Du(1).$$

The prediction of the third step is $$\hat{x}(3|0) = A\hat{x}(2|0) + Bu(2) = A(A(Ax0 + Bu(0) + K(y(0) - Cx0 - Du(0))) + Bu(1)) + Bu(2);$$

$$\hat{y}(2|0) = C\hat{x}(2|0) + Du(2) = C(A(Ax0 + Bu(0) + K(y(0) - Cx0 - Du(0))) + Bu(1)) + Du(2).$$

The forth step prediction is $$\hat{x}(4|0) = A\hat{x}(3|0) + Bu(3) = A(A(A(Ax0 + Bu(0) + K(y(0) - Cx0 - Du(0))) + Bu(1)) + Bu(2)) + Bu(3);$$

$$\hat{y}(3|0) = C\hat{x}(3|0) + Du(3) = C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x0, y(0), u(0), u(1), u(2), and u(3), the pattern revealed is:

$$\hat{x}(1|0) = Ax0 + Bu(0) + K(y(0) - Cx0 - Du(0));$$

$$\hat{x}(2|0) = (A^2 - AKC)x0 + (AB - AKD)u(0) + Bu(1) + AKy(0);$$

$$\hat{x}(3|0) = (A^3 - A^2KC)x0 + (A^2B - A^2K D)u(0) + ABu(1) + Bu(2) + A^2Ky(0);$$

$$\hat{x}(4|0) = (A^4 - A^3KC)x0 + (A^3B - A^3KD)u(0) + A^2Bu(1)ABu(2) + Bu(3) + A^3Ky(0);$$

$$\hat{y}(0) = Cx0 + Du(0);$$

$$\hat{y}(1|0) = (CA - CKC)x0 + (CB - CKD)u(0) + Du(1) + CKy(0);$$

$$\hat{y}(2|0) = (CA^2 - CAKC)x0 + (CAB - CAKD)u(0) + CBu(1) + Du(2) + CAKy(0);$$

$$\hat{y}(3|0) = (C A^3 - C A^2KC)x0 + (CA^2B - C A^2K D)u(0) + CABu(1) + CBu(2) + Du(3) + CA^2Ky(0).$$

Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix}, \tilde{\hat{y}}(0) = \begin{bmatrix} \hat{y}(0) \\ \hat{y}(1|0) \\ \hat{y}(2|0) \\ \hat{y}(3|0) \end{bmatrix}, \tilde{y}(0) = \begin{bmatrix} y(0) \\ y(1) \\ y(2) \\ y(3) \end{bmatrix},$$

$\hat{x}(1|0)$ and x0 remain unchanged.

The new system that has the 4-step prediction casted into a one-step prediction which can be analyzed by the prediction error function generator 430 using an existing system identification software product as:

$$\hat{x}(1|0) = Ax0 + [B \ 0 \ 0 \ 0 \ 0]\tilde{u}(0) + [K \ 0 \ 0 \ 0]\tilde{y}(0) - \tilde{\hat{y}}(0);$$

$$\tilde{\hat{y}}(0) = \begin{bmatrix} C \\ (CA - CKC) \\ (CA^2 - CAKC) \\ (CA^3 - CA^2KC) \end{bmatrix} x$$

$$0 + \begin{bmatrix} D & 0 & 0 & 0 & 0 \\ (CB - CKD) & D & 0 & 0 & CK \\ (CAB - CAKD) & CB & D & 0 & CAK \\ (CA^2B - CA^2KD) & CAB & CB & D & CA^2K \end{bmatrix} \tilde{\hat{y}}(0).$$

In order to have the general formulation at time k for predicting $h_{max}$ step ahead in time, this four-step example can be extrapolated to define the general augmented input and output vectors as:

$$\tilde{\hat{y}}(k) = \begin{bmatrix} C \\ (CA - CKC) \\ (CA^2 - CAKC) \\ \vdots \\ (CA^{h_{max}} - CA^{h_{max}-1}KC) \end{bmatrix} \hat{x}(k|k-1) +$$

$$\begin{bmatrix} D & 0 & 0 & 0 & 0 & 0 & 0 \\ (CB - CKD) & D & 0 & 0 & 0 & 0 & CK \\ (CAB - CAKD) & CB & D & 0 & 0 & 0 & CAK \\ (CA^2B - CA^2KD) & CAB & \ddots & \ddots & 0 & 0 & CA^2K \\ \vdots & \vdots & \ddots & CB & D & 0 & \vdots \\ (CA^{h_{max}-1}B - & & & & & & \\ CA^{h_{max}-1}KD) & CA^{h_{max}-2}B & \dots & CAB & CB & D & CA^{h_{max}-1}K \end{bmatrix}$$

$\tilde{u}(k);$ $$\tilde{u}(k) = \begin{bmatrix} u(k) \\ u(k+1) \\ \vdots \\ u(k+h_{max}) \\ y(k) \end{bmatrix}, \tilde{\hat{y}}(k) = \begin{bmatrix} \hat{y}(k|k-1) \\ \hat{y}(k+1|k-1) \\ \vdots \\ \hat{y}(k+h_{max}|k-1) \end{bmatrix},$$

$$\tilde{y}(k) = \begin{bmatrix} y(k) \\ y(k+1) \\ \vdots \\ y(k+h_{max}) \end{bmatrix}$$

With these definition, the general formulation at time k for predicting $h_{max}$ steps ahead in time is:

$$\hat{x}(k+1|k) = A\hat{x}(k|k-1) + [B0 \dots 0]\tilde{u}(k) + [K0 \dots 0](\tilde{y}(k) - \tilde{\hat{y}}(k)).$$

As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h)\|y(k+h) - \hat{y}(k+h|k-1, \phi)\|_2^2. \quad (Eq. \ M)$$

If w(h)=1 for all h, and using the augmented input and output vectors defined above, the multi-step ahead prediction performance function can be reconfigured into the following one-step ahead prediction performance function by the prediction error function generator 430:

$$V_N(\theta, Z^N) = V_N(\theta, Z^N) = \sum_{k=1}^{N-h_{max}+1} \|\tilde{y}(k) - \tilde{\hat{y}}(k, \theta)\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
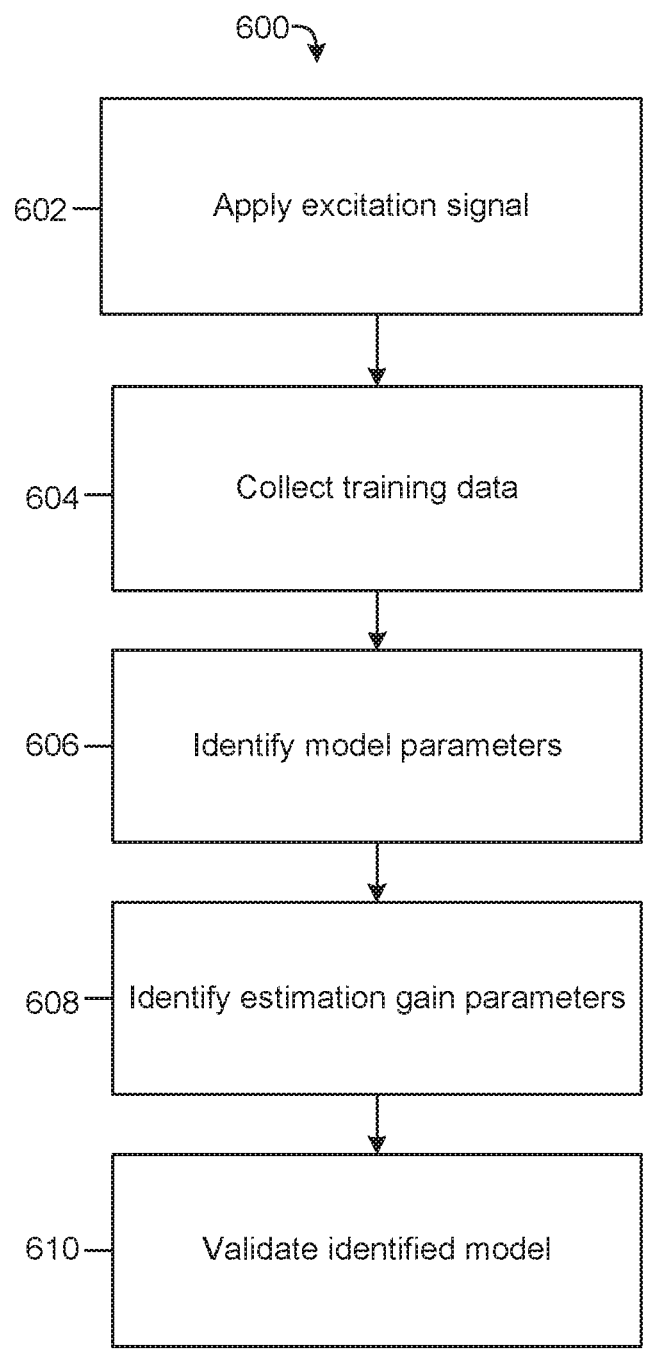
FIG. 6 is flowchart of a process for system identification, according to an exemplary embodiment.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measureable temperature readings, i.e., $T_{oa}$ and $T_{ia}$, controller-determined values $\dot{Q}_{HVAC}$ and $T_{sp}$ for each of a plurality of time steps k, k= 0, ..., N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), B(θ), C(θ), and D(θ) that minimize a prediction performance function $V_N(Z^N, \theta)$ for the model:

$$\dot{x}(t) = A_c(\theta)x(t) + B_c(\theta)u(t); \quad (Eq. \ G)$$

$$y(t) = C_c(\theta)x(t) + D_c(\theta)u(t); \quad (Eq. \ H).$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail with reference to FIGS. 7-8.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7-8. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby by dynamically adjusted to adjust for changes in the physical system.

Referring now to FIGS. 7-8 the multi-step ahead prediction error approach for use in system identification is illustrated, according to an exemplary embodiment. In FIG. 7, a flowchart of a process 700 for identifying system parameters using the multi-step ahead prediction error approach is shown, according to an exemplary embodiment. FIG. 8 shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N=[y(1), u(1), y(2), u(2), \ldots, y(N), u(N)]$ from the training data database 410. The training data includes measured outputs $y(k)$ (i.e., $T_{ia}(k)$ and $\dot{Q}_{HVAC}(k)$) and inputs $u(k)$ (i.e., $T_{oa}(k)$ and $T_{sp}(k)$) for each time step k, k 1, . . . , N. N is the number of samples in the training data. The gain parameter identifier 420 also receives the system model from the system parameter identifier 418.

At step 704, the prediction error function generator 430 uses the training data for a time step k to predict outputs $\hat{y}$ for each subsequent time step up to $k+h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 8 and described below, predictions are made three steps ahead, corresponding to $h_{max}=2$ in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs $[\hat{y}(k|k-1), \hat{y}(k+1|k-1), \ldots \hat{y}(k+h_{max}|k-1)]$ are predicted based on the past training data (i.e., through step k-l), denoted as $Z^{k-l}$, along with future inputs $[u(k), u(k+1) \ldots u(k+h_{max})]$. These predictions are made using the model $\mathcal{M}(\phi)$, such that predicted outputs $\hat{y}$ depend on $\phi$.

To illustrate the predictions of step 704, FIG. 8 shows a simplified visualization in which $y(k)$ and $\hat{y}(k)$ are depicted as scalar values for the sake of simplified explanation. In FIG. 8, the graph 800 plots the values of y and $\hat{y}$ over time t for five time steps past a starting time t=0. The solid circles 802 represent measured outputs $y(t)$ from the training data. The unfilled boxes 804 represent predicted outputs $\hat{y}(t|0)$, that is, the outputs predicted for each time step based on the input/output data available at time t=0 (e.g., $y(0)$). The dashed lines represent the propagation of the predictions; for example, graph 800 includes three unfilled boxes 804 connected by a dashed line to the solid circle 802 corresponding to $y(0)$. This shows that the predictions $\hat{y}(t|0)$, $1 \leq t \leq 3$, represented by the unfilled boxes 804 were based on the measured value of $y(0)$.

At step 706, the prediction error function generator 430 compares the predicted outputs $\hat{y}$ to the measured outputs y for each future step up to $k+h_{max}$ (i.e., for all predicted outputs $\hat{y}$ generated at step 704). More specifically, an error term for each step may be defined as $y(k+h)-\hat{y}(k+h|k-1, \phi)$. Because y and $\hat{y}$ are vectors, the two-norm of this error term may be taken and squared to facilitate comparison between prediction errors as scalars, such that the error term becomes $\|y(k+h)-\hat{y}(k+h|k-1, \phi)\|_2^2$. This term appears in Eq. M above.

As shown in FIG. 8, step 706 can be understood as measuring the distance between, for example, each unfilled box 804 and the corresponding solid circle 802 (i.e., the unfilled box 804 and the solid circle 802 at the same time t). Thus, in the example of FIG. 8, step 706 includes calculating three error terms.

At step 708, the error terms are weighted based on a weighting function $w(h)$. The weighting function $w(h)$ allows the prediction errors to be given more or less weight depending on how many steps ahead the prediction is. The weighting function $w(h)$ is preferably a monotonically decreasing function of h, so that farther-out-in-time predictions have less influence on the prediction error. In some embodiments, the weighting function $w(h)=1$. Step 708 thereby corresponds the $w(h)$ term in Eq. M above.

The process 700 then returns to step 704 to repeat steps 704-706 for each value of k, k=1, N-$h_{max}$. As illustrated in FIG. 8, repeating step 704 corresponds to generating the predictions represented by the unfilled circles 808 and the unfilled triangles 810. The unfilled circles 808 chart the predictions based on the output data available at time t=1, i.e., $\hat{y}(t|l)$, for t=2, 3, 4. The unfilled triangles chart the predictions based on the output data available at time t=2, i.e., $\hat{y}(t|2)$, for t=3, 4, 5. Process 700 therefore involves making multiple predictions for most time steps: for example, FIG. 8 shows three separate predictions for time t=3.

At step 706, the prediction error function generator 430 again compares the predicted outputs $\hat{y}$ for the new value of k to the measured outputs y for each future step up to $k+h_{max}$ to define the error term $\|y(k+h)-\hat{y}(k+h|k-1, \theta)\|_2^2$ as included in Eq. M. At step 708, the terms are again weighted by the weighting function $w(h)$. The weighting function $w(h)$ may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\theta, Z^N) = \sum_{k=1}^{N-h_{max}+1} \sum_{h=0}^{h_{max}} w(h) \|y(k+h) - \hat{y}(k+h \mid k-1, \phi)\|_2^2. \quad \text{(Eq. M)}$$

The prediction performance function is a function of the input data $Z^N$ and the parameter variable $\phi$. Typically, the input data $Z^N$ is given (i.e., received by the model identifier 412 and used in the calculation of error terms as described above). Thus, the prediction performance function is primarily a function of $\phi$.

At step 712, the prediction performance function $V_N(\phi, Z^N)$ is minimized to find an optimal parameter vector $\hat{\theta}_N = \arg\min_{\theta \in D} \mathcal{M} \ V_N(\phi, Z^N)$. Any minimization procedure may be followed. The result of step 712 is a vector $\hat{\phi}_N$ of identified model parameters that tune the model $\mathcal{M}(\hat{\phi}_N)$ to accurately predict system evolution multiple steps ahead. At step 714, the model identifier 412 provides the identified system model (i.e., $\mathcal{M}(\hat{\phi}_N)$) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Efficient Model Generation for System Identification

Figure 9:
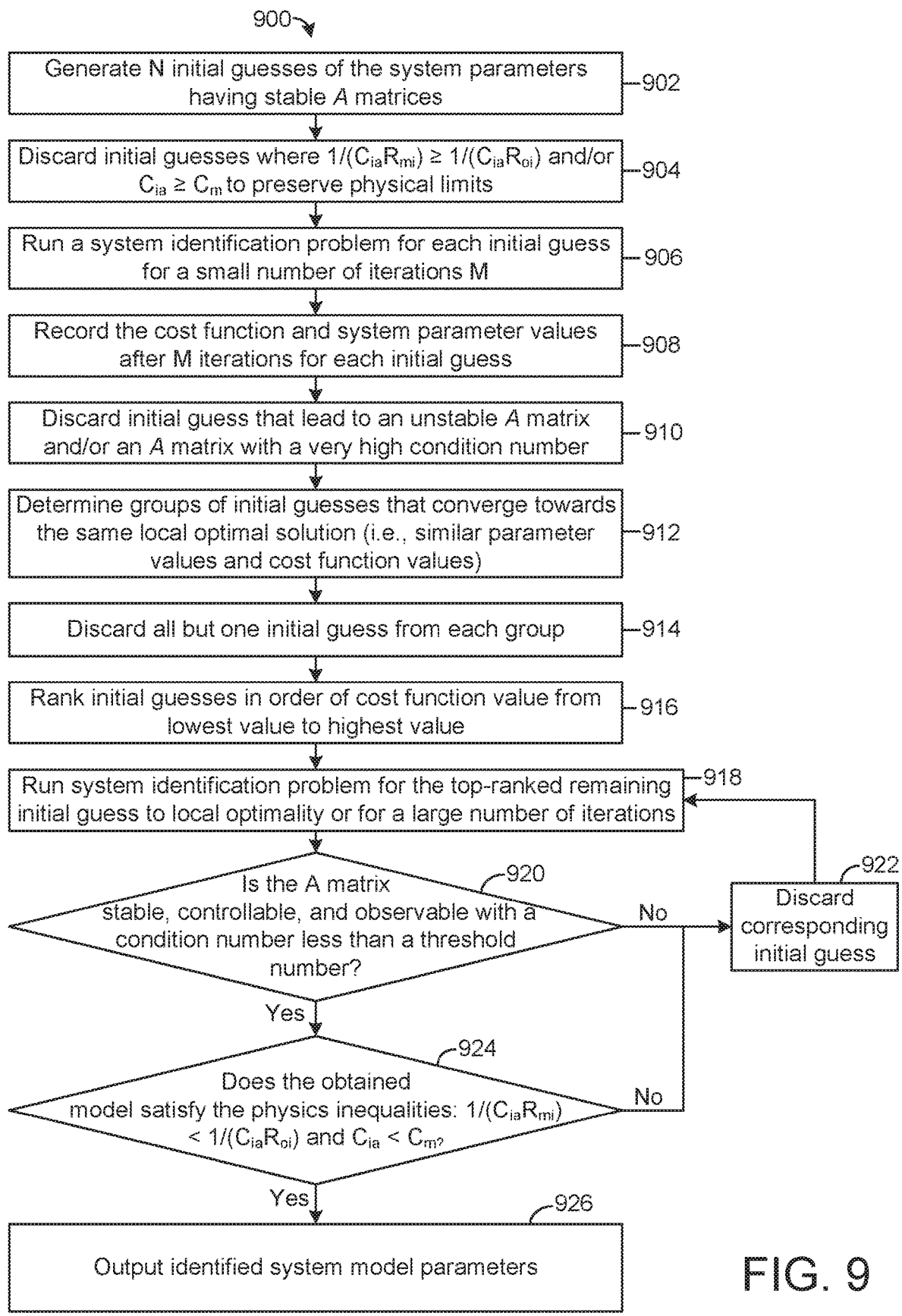
FIG. 9 is a flowchart a first process for efficient model generation which can be performed by the model identifier of FIG. 5, according to an exemplary embodiment.

Referring now to FIG. 9, a flowchart showing a process 900 for optimizing the prediction performance function (cost function) to identify model parameters is shown, according to an exemplary embodiment. The optimizer 426 of the system parameter identifier 418 of FIG. 5 may be configured to executed the process 900, and reference is made thereto in the following description of process 900. In some embodiments, the process 900 is included in step 712 of the process 700 of FIG. 7.

At step 902, the optimizer 426 generates a number N of initial guesses of the system parameters $\theta$, where the matrix $A(\theta)$ is stable. In some embodiments, the optimizer 426 may ensure that the matrix A is stable by initiating all six parameters to be positive and checking that each eigenvalue of the resulting A matrix has a negative real part. In some embodiments, the optimizer 426 may ensure that the matrix A is stable by initiating the fifth parameter to zero $$\left(\theta_5 = \frac{1}{\tau} = 0\right),$$

and initiating me remaining five parameters to positive values, which establishes the circuit-style diagram 300 shown in FIG. 3 as a passive circuit.

At step 904, the optimizer 426 discards initial guesses for which $$\frac{1}{C_{ia}R_{mi}} \geq \frac{1}{C_{ia}R_{oi}}$$

and $C_{ia} \geq C_m$. That is, the optimizer 426 checks that the indoor air-thermal mass thermal resistance is larger than the indoor air-outdoor air thermal resistance and that the lump mass thermal capacitance value is larger than the indoor air thermal capacitance, and discards initial guesses that violate these physical requirements. The optimizer 426 thereby ensures that the remaining initial guesses conform with requirements from the basic physics of the system.

At step 906, the optimizer 426 runs a system identification problem for each remaining initial guess for a small number of iterations M. The small number M may be substantially lower than the number of iterations needed to reach local optimality for the system identification problem given an initial guess. By only running M iterations, the process 900 limits the computation required at step 906 (e.g., computation time, computing resources used) relative to other possible approaches. At step 908, for each remaining initial guess, the optimizer 426 records (e.g., stores, saves) the value of the cost function and the system parameter values after the M iterations.

At step 910, the optimizer 426 discards initial guesses that lead to an unstable A matrix and/or an A matrix with a very high condition number after M iterations (i.e., as recorded at step 908). That is, the optimizer 426 may check whether each A matrix recorded at step 908 is stable, and keep only the initial guesses corresponding to a stable A matrix. The optimizer 426 may also determine the condition number of the A matrix and only keep the corresponding initial guess if the condition number is less than a very high threshold number.

Figure 11:
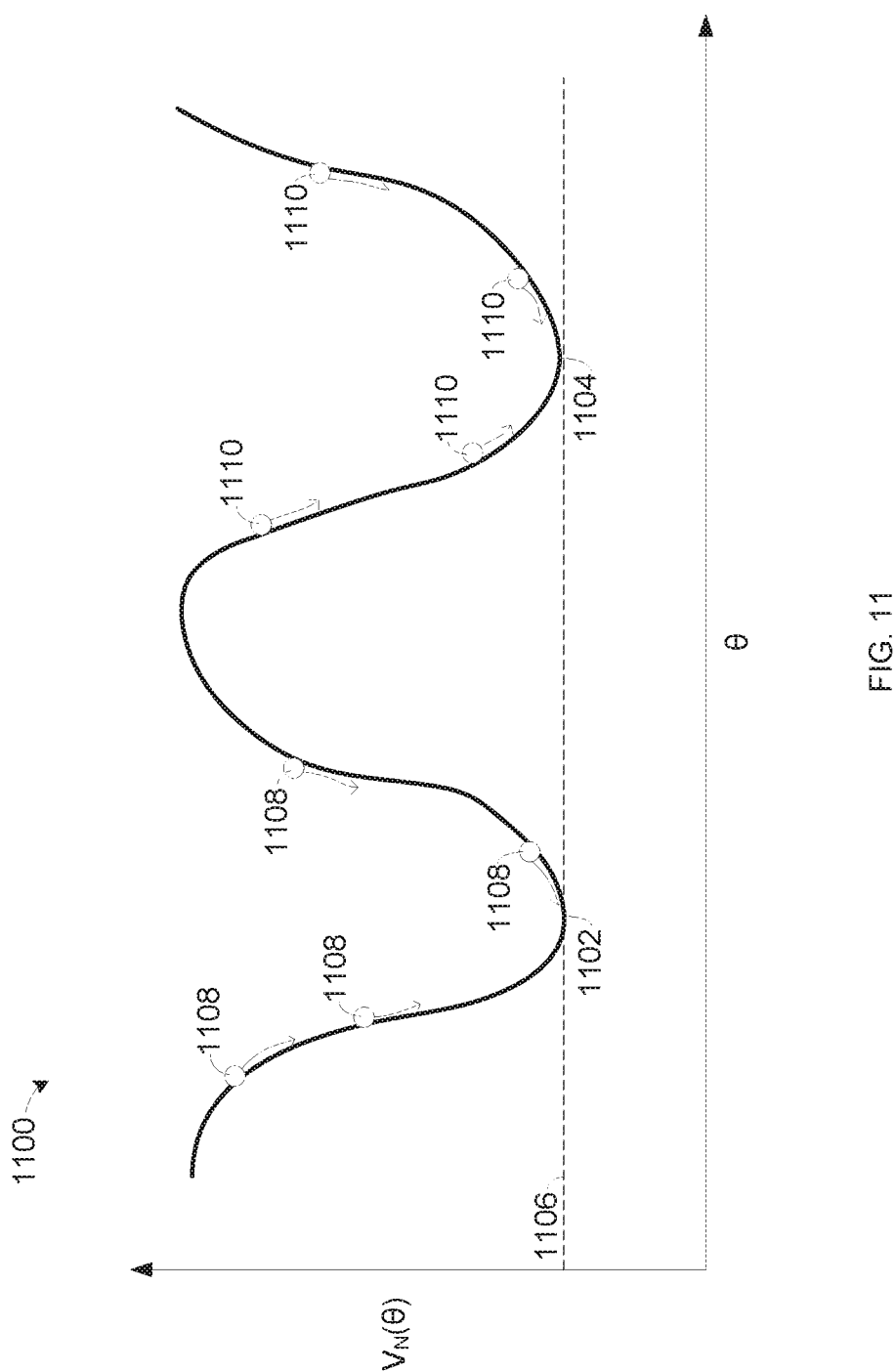
FIG. 11 is a visualization that facilitates explanation of the processes of FIGS. 9 and 10, according to an exemplary embodiment.

At step 912, the optimizer 426 determines groups of initial guesses that converge towards the same local optimal solution (i.e., a similar cost function value and similar parameter values). At step 914, the optimizer 426 discards all but one initial guess from each group. FIG. 11 is included to illustrate steps 912 and 914 (depicted with a single parameter variable $\theta$ for the sake of clarity). FIG. 11 shows a graph 1100 of a cost function $V(\theta)$ with the value of the cost function $V(\theta)$ on the vertical axis and the parameter value $\theta$ on the horizontal axis. The region of the cost function $V(\theta)$ shown in FIG. 11 has a first local optimum 1102 and a second local optimum 1104 that have similar cost function values (i.e., positions on the vertical axis as illustrated by dotted line 1106) but different parameter values. Also illustrated in FIG. 11 is a first group of multiple initial guesses 1108 illustrated as trending towards either the first local optimum 1102 and a second group of multiple initial guesses 1110 illustrated as trending towards the second local optimum 1104.

Because all of the initial guesses 1108 trending towards the first local optimum 1102 will eventually converge to the first local optimum 1102, only one initial guess 1108 of the first group of initial guesses 1108 needs to be kept in order to have an initial guess that leads the system identification problem to the first local optimum 1102 after a large number of iterations. Similarly, because all of the initial guesses 1110 trending towards the second local optimum 1104 will eventually converge to the second local optimum 1104, only one initial guess of the second group of initial guesses 1110 needs to be kept in order to have an initial guess that leads the system identification problem to the second local optimum 1104 after a large number of iterations. Accordingly, all but one of the first group of initial guesses 1108 and all but one of the second group of initial guesses 1110 can be discarded to avoid duplication, triplication, etc. of computations in later phases of process 900. It should be understood that one of the local optima may also be a global optimum.

Still referring to FIG. 9, at step 916 the optimizer 426 ranks the remaining initial guesses in order of cost function value from lowest value to highest value after the M iterations. A lower cost function value corresponds to a higher accuracy of the predictive model, such that a top-ranked initial guess (i.e., having the lowest cost function value) may be understood as corresponding to the most accurate set of parameter values after the M iterations.

At step 918, the optimizer 426 chooses the top-ranked initial guess and runs the system identification problem for the top-ranked initial guess to local optimality or for a large number of iterations P. The optimizer 426 thereby generates a set of parameters characterized by the A, B, C, and D matrices defined above based on the top-ranked initial guess.

At step 920, the optimizer 426 checks whether the A matrix is stable, controllable and observable. The optimizer 426 also checks whether the condition number of the A matrix is less than a threshold number L. If the A matrix is unstable, uncontrollable, unobservable, or has a condition number greater than L, then the process 900 proceeds to step 922 where the corresponding initial guess is discarded. If the A matrix is stable, controllable, observable, and has a condition number less than the threshold number, then the process 900 proceeds to step 924.

At step 924, the optimizer 426 checks whether the obtained model (i.e., after P iterations) satisfies the physics-based inequalities $$\frac{1}{C_{ia}R_{mi}} < \frac{1}{c_{ia}R_{oi}}$$

and $C_{ia} < C_m$, which describe limits from the physics of the system. These inequalities are the same as those used in step 904 and described in detail above. If the inequalities are not satisfied (i.e., if $$\frac{1}{C_{ia}R_{mi}} \geq \frac{1}{c_{ia}R_{oi}}$$

or $C_{ia} \geq C_m$), the process 900 proceeds to step 922 where the corresponding initial guess is discarded. The process 900 then returns to step 918, where the system optimization problem is run for the top-ranked remaining initial guess to local optimality or for a large number of iterations P. The process 900 thereby repeats steps 918-922 until an A matrix is obtained that satisfies the conditions of steps 920 and 924 (i.e., a model is identified for which A is stable, controllable, and observable, has a condition number less than the threshold number, and satisfies $$\frac{1}{C_{ia}R_{mi}} < \frac{1}{c_{ia}R_{oi}}$$

and $C_{ia} < C_m$). The process 900 then proceeds to step 926 where the system model parameters are identified in accordance with the obtained model that satisfies the conditions of steps 920 and 924. At step 926, the system model parameters (e.g., the obtained A, B, C, and D matrices) may be output from the optimizer 426 to the gain parameter identifier 420 as shown in FIG. 5.

Notably, process 900 avoids running poor initial guesses all the way to local optimality (i.e., for a large number of iterations). Process 900 also avoids running multiple initial guesses to the same local optimum. The process 900 is therefore substantially more efficient than other approaches for example generating many initial guesses, running all to local optimality, checking the quality of all models to choose the best result as the obtained model, and repeating the entire process if the obtained model is not satisfactory (e.g., does not satisfy the criteria in steps 920 and 924). Experimental results showing this improvement are described below with reference to FIGS. 12-13.

Figure 10:
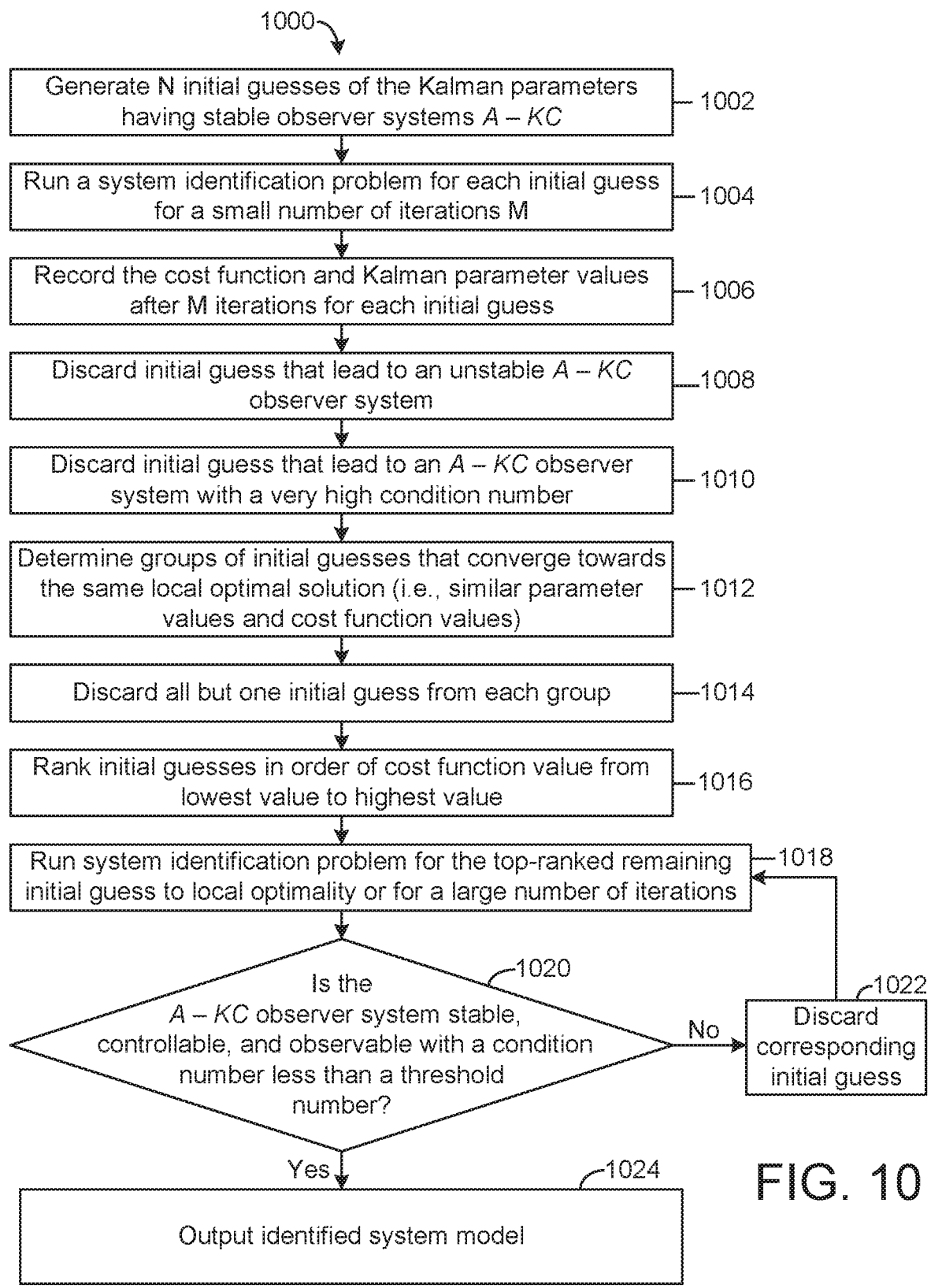
FIG. 10 is a flowchart of a second process for efficient model generation which can be performed by the model identifier of FIG. 5, according to an exemplary embodiment.

Referring now to FIG. 10, a flowchart of a process 1000 for identifying Kalman gain parameters as part of a system identification process is shown, according to an exemplary embodiment. The process 1000 may be executed by the optimizer 432 of the gain parameter identifier 420 of FIG. 5. The process 1000 may be included in step 608 of FIG. 6. The optimizer 432 may use the system model parameters identified via process 900 as an input to process 1000.

At step 1002, the optimizer 432 generates N initial guesses of the Kalman gain parameters, with each initial guess having a stable observer system A-KC, i.e., for which all eigenvalues of A-KC are in the unit circuit. In some embodiments, the optimizer 432 ensures that the initial guess have a stable observer system A-KC using pole placement in which an observer gain is calculated in such a way that places the eigenvalues of A-KC in any desired location provided that the system is observable.

At step 1004, the optimizer 432 runs a system identification problem for each initial guess for a small number of iterations M. After the M iterations, at step 1006 the optimizer 432 records the cost function and the Kalman gain parameter values that were reached for each initial guess.

At step 1008, the optimizer 432 discards initial guesses that lead to an unstable A-KC observer system. That is, for each initial guess, the optimizer 432 may check whether A-KC is stable after M iterations and only keeps the corresponding guess if the optimizer 432 determines that A-KC is stable. At step 1010, the optimizer 432 discards initial guesses that lead to an A-KC observer system with a very high condition number (e.g., higher than a threshold number). That is, for each initial guess, the optimizer 432 determines the condition number of A-KC and only keeps the corresponding initial guess if the condition number is less than a very high threshold number.

At step 1012, the optimizer 432 determines groups of initial guesses that converge towards the same local optimal solution (e.g., with similar Kalman gain parameter values and cost function values). At step 1014, the optimizer 432 discards all but one initial guess from each group of initial guesses that converge towards the same local optimal solution. Step 1012 and step 1014 may be explained with reference to FIG. 11 in a similar manner as for steps 912 and steps 914 above and not repeated here for the sake of brevity. The optimizer 432 thereby avoids running multiple initial guesses of the Kalman gain parameters through many iterations of the system identification problem and/or all of the way to local optimality.

At step 1016, the optimizer 432 ranks the initial guesses in order of cost function value from lowest value to highest value after the M iterations, i.e., such that the top-ranked initial guess corresponds to the lowest cost function value after the small number M of iterations. At step 1018, the optimizer 432 runs the system identification problem for the top-ranked initial guess to local optimality or for a large number of iterations P. The optimizer 432 thereby generates values for the Kalman gain parameters based on the top-ranked initial guess.

At step 1020, the optimizer 432 checks whether the A-KC observer system is stable, controllable, and observable with a condition number less than a threshold number L. If those criteria are not met (i.e., if the A-KC observer system is unstable, uncontrollable, unobservable, or has a condition number higher than L), the process 1000 proceeds to step 1022 where the corresponding initial guess is discard. The process 1000 then returns to step 1018 where the system identification problem is run for the top-ranked remaining initial guess to local optimality or for a large number of iterations, the result of which is checked against the criteria described above at step 1020. Steps 1018, 1020 and 1022 may thereby be repeated until an initial guess leads to an A-KC observer system that is stable, controllable, and observable with a condition number less than the threshold number L.

At step 1024, the resulting obtained system model is output, for example from the optimizer 432 to the model predictive controller 414 of FIG. 4. Combined with the A, B, C, and D matrices identified in process 900, the process 1000 thereby provides identified Kalman gain K. The resulting identified model may be applied in a model predictive control approach as described in detail above to control the building equipment based on the identified model.

Notably, process 100 avoids running poor initial guesses all the way to local optimality (i.e., for a large number of iterations). Process 1000 also avoids running multiple initial guesses to the same local optimum. The process 1000 is therefore substantially more efficient than other approaches for example generating many initial guesses, running all to local optimality, checking the quality of all models to choose the best result as the obtained model, and repeating the entire process if the obtained model is not satisfactory (e.g., does not satisfy the criteria in step 1020). Experimental results showing this improvement are described below with reference to FIGS. 12-13.

Figure 12:
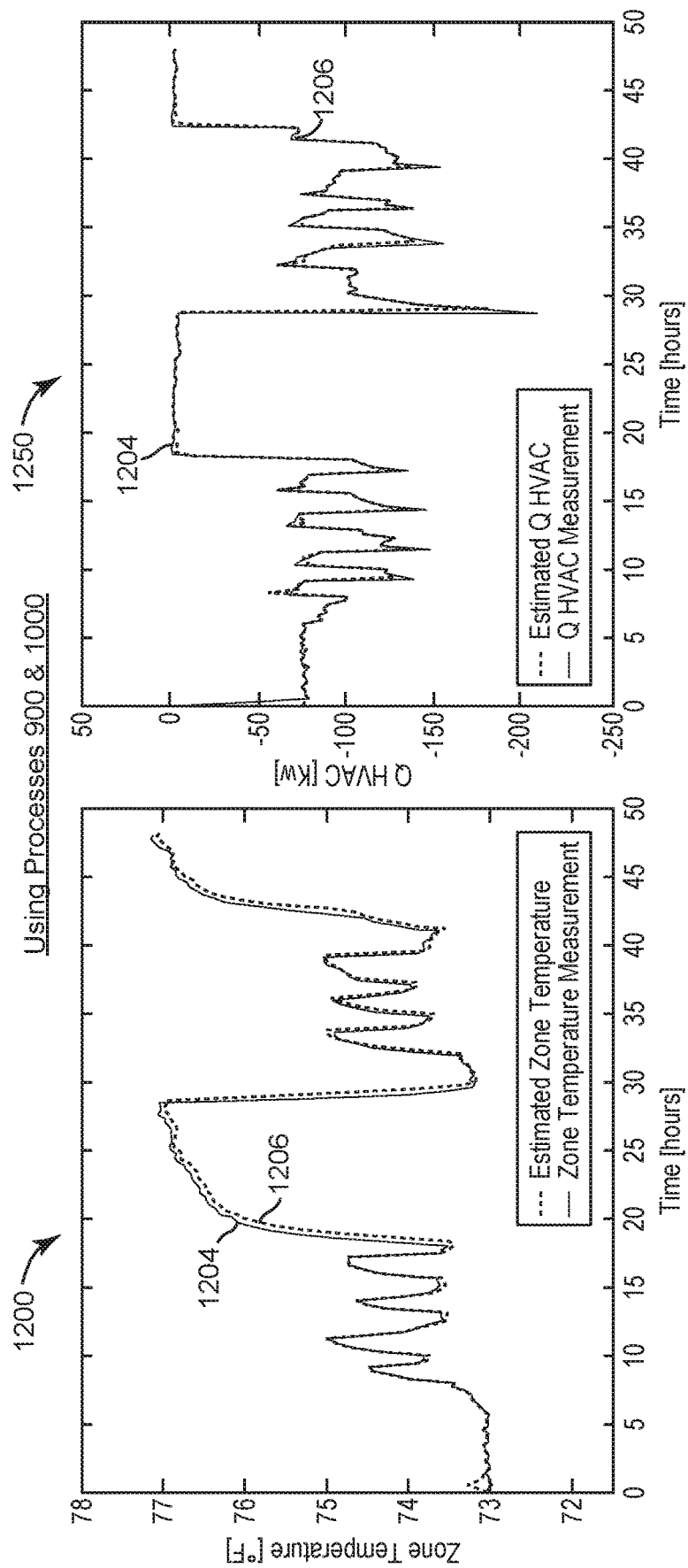
FIG. 12 is a graphical representation of experimental results obtained using the processes of FIGS. 9 and 10, according to an exemplary embodiment.
Figure 13:
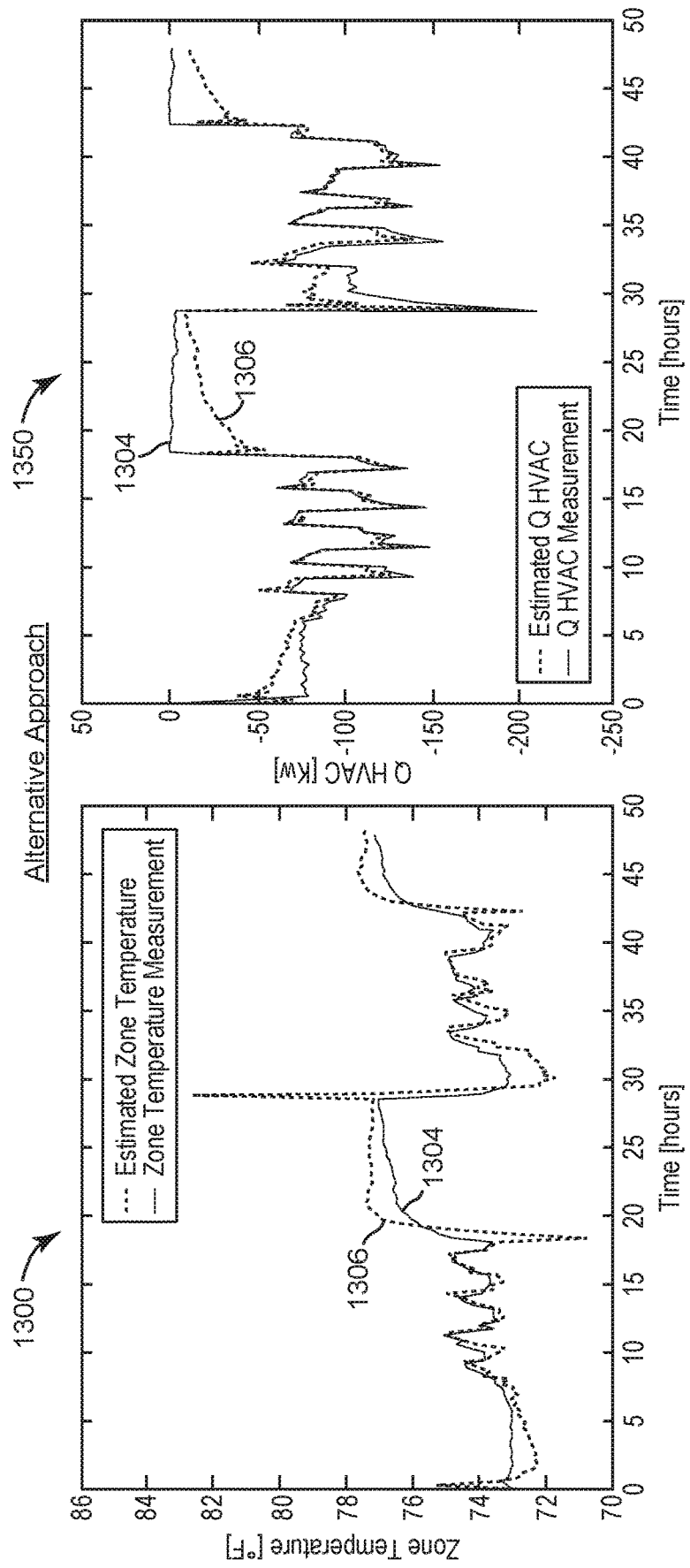
FIG. 13 is a graphical representation of experiment results obtained without using the processes of FIGS. 9 and 10, for sake of comparison to FIG. 12.

Referring now to FIGS. 12-13, graphical representations of experimental results demonstrating the advantages of process 900 and process 1000 are shown, according to an exemplary embodiment. FIG. 12 shows experimental results obtained using processes 900 and 1000, and illustrate the improved prediction accuracy achieved using processes 900 and 1000. For the sake of comparison, FIG. 13 shows experimental results obtained using an alternative approach of many initial guesses, running all to local optimality, checking the quality of all models to choose the best result as the obtained model, and repeating the entire process if the obtained model is not satisfactory. The graphical representations shown are described in further detail below.

To obtain the experimental results shown in FIGS. 12-13, an experiment was conducted on an area of a building located in Milwaukee, Wis. A pseudorandom binary sequence (PBRS) temperature setpoint $T_{sp}$ signal was generated varying between the values of 73° F. and 75° F. The PRBS signal is designed to stay at each setpoint value for a minimum duration of one hour. The experiment took place over the course of two days where inputs ($T_{sp}$, $T_{oa}$) and output ($T_{ia}$, $\dot{Q}_{HVAC}$) were collected every ten minutes. The HVAC system utilized in the experiment has a dead-band of 0.5° F.

In a first experiment (corresponding to the results shown in FIG. 12), the collected data was first processed through a saturation detection and removal process, as described in detail in U.S. patent application Ser. No. 15/900,459, filed Feb. 20, 2018, incorporated by reference in its entirety herein. The remaining data was used for parameter estimation based on the state-space system model described in detail above. The simulation prediction error method was used to identify the model parameters, the resulting state-space model was augmented with an integrating disturbance model, and the Kalman filter gain was estimated using the one-step ahead prediction error method. Additionally, the efficient model generation process of FIGS. 9 and 10 (i.e., process 900 and process 1000) were applied to facilitate efficient generation of initial guesses and optimization of the prediction error cost functions. For identification of the parameter models (i.e., for process 900), the following values were used: N=50, M=25, P=400, L=9000. For Kalman gain estimation (i.e., for process 1000), the following values were used: N=50, M=50, P=400, L=20,000. The total computation time required for the system identification process to yield an identified system model was 307 CPU seconds.

The resulting model was used to generate and record one-step ahead predictions of the outputs over a two-day period. Actual input-output data for the same time period was also recorded. Illustrating these results, FIG. 12 includes a first graph 1200 that shows zone temperature plotted over time and a second graph 1202 that shows $\dot{Q}_{HVAC}$ plotted over time. Both graphs include a measured line 1204 that represents actual/measured data and a predicted line 1206 that shows the predictions made using the model generated as described above. In both the first graph 1200 and the second graph 1202, the predicted line 1206 closely tracks the measured line 1204. The 2-norm of the one-step prediction error in the outputs of the two days was 1.6175 for the zone temperature and 16.6594 for $\dot{Q}_{HVAC}$.

For comparison, a second experiment was conducted over the same collected input-output data without the use of the efficient model generation process of FIGS. 9 and 10 (i.e., without process 900 and process 1000). Instead, each initial guess was run to local optimality and the stability, controllability, observability, and condition numbers of the identified A and A-KC matrices were evaluated. If the result was not satisfactory (i.e., if A or A-KC is unstable, uncontrollable, unobservable, or has a very high condition number), another random guess was generated, used to run the system identification problem to local optimality, and the result was evaluated. An acceptable model was eventually identified. The total computational time for this method to result in an acceptable model was 1923 CPU seconds.

As in the first experiment, the model was used to generate one-step predictions of the outputs over the two-day period. FIG. 13 shows a third graph 1300 that shows zone temperature plotted over time and a fourth graph 1302 that shows $\dot{Q}_{HVAC}$ plotted over time. Both graphs 1300, 1302 include a measured line 1304 that represents actual/measured data and a predicted line 1306 that shows the predictions made using the model generated as described above. In both graphs 1300, 1302, the predicted line 1306 roughly follows the measured line 1304, but with noticeably less accuracy than the predicted line 1206 of FIG. 12. In the second experiment, the 2-norm of the one-step prediction error of the outputs for the two days was 7.8597 for the zone temperature and 94.4387 for $\dot{Q}_{HVAC}$, i.e., substantially worse than as stated above for the first experiment.

Accordingly, these experiments demonstrate that the systems and methods described herein for efficient model generation as shown in FIGS. 9 and 10 provide improved efficiency and save computational time and resources in generating models (e.g., about a 6-fold improvement in the experiment of FIGS. 12-13) as well as improved accuracy of the resulting predictive models. The improved accuracy of the resulting predictive models results in improved control of building equipment to meet demands while minimizing operational and energy consumption costs. The systems and methods described herein thereby constitute concrete, technical improvements in the building equipment and building management systems.

Figure 14:
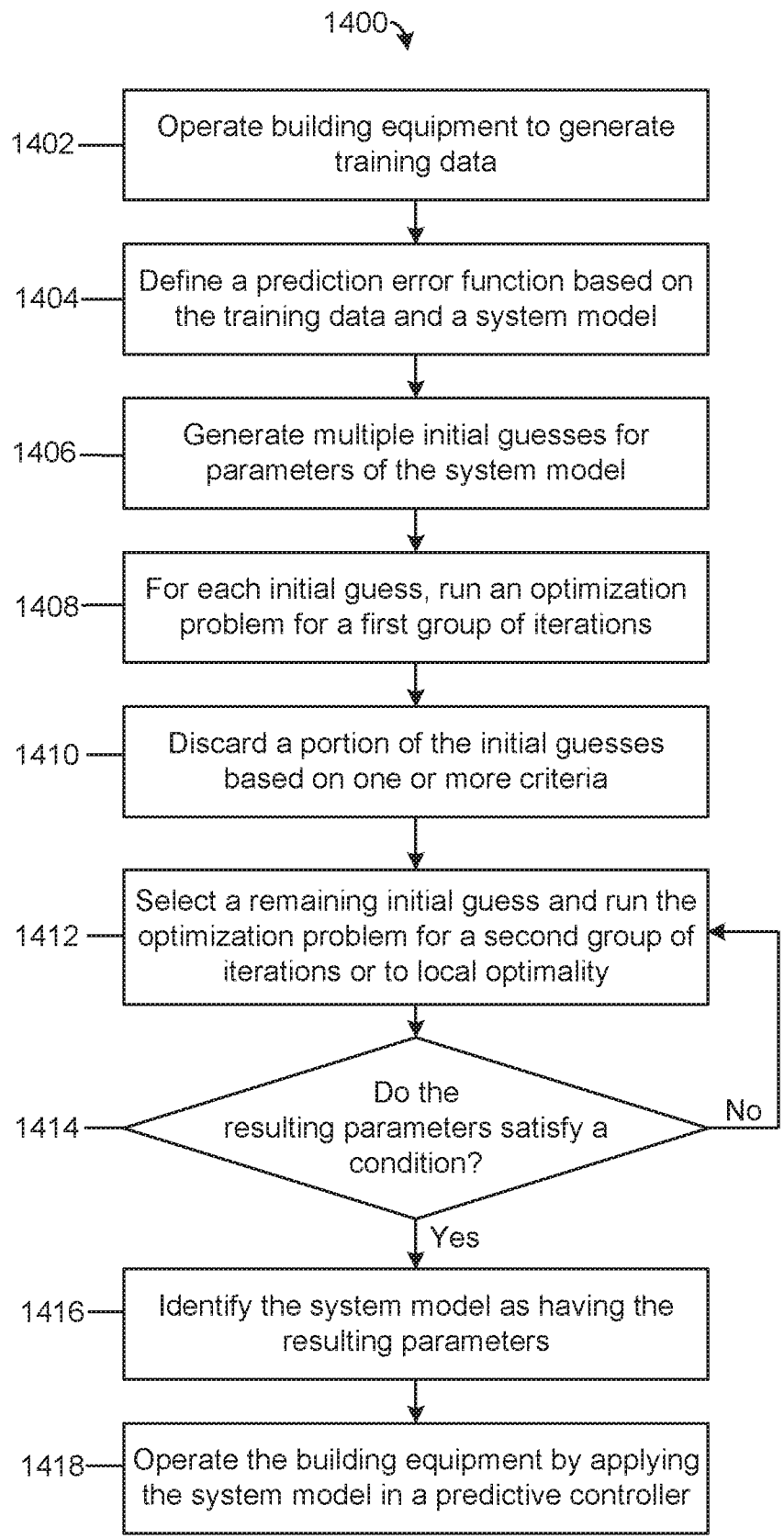
FIG. 14 is a flowchart of a process for generating a system model for a building system and controlling building equipment in accordance with the system model, according to an exemplary embodiment.

Referring now to FIG. 14, a flowchart of a process 1400 for generating a system model for a building system and controlling building equipment in accordance with the system model is shown, according to an exemplary embodiment. Process 1400 may be carried out by the controller 212 of FIG. 4 and may correspond to various steps of process 600 of FIG. 6. Various steps of process 1400 may also correspond to various steps of process 900 and process 1000.

At step 1402, building equipment (e.g., HVAC equipment 210) is operated to generate training data. For example, an excitation signal may be provided and the inputs and outputs of the system recorded as described above with reference to FIGS. 4 and 6. At step 1404, a prediction error function (cost function) is defined based on the training data and a system model. The prediction error function may be based on a one-step ahead prediction error approach, a simulation prediction error approach, and/or a multi-step ahead prediction error approach. The prediction error function is a function of the parameters of the system model, for example as shown above in Eq. M above.

At step 1406, multiple initial guesses are generated for the parameters of the system model. The initial guesses may be selected as described with reference to steps 902-904 and step 1002 above. At step 1408, an optimization problem is run for each initial guess for a first group of iterations (e.g., a small number of iterations as described with reference to steps 906 and 1004). The resulting parameters and prediction error functions may be recorded.

At step 1410, a portion of the initial guesses are discarded based on one or more criteria, for example as described with reference to steps 910-914 and steps 1008-1014. Various criteria are possible in various embodiments. In some embodiments, the one or more criteria include stability, observability, and controllability of a matrix of the system model. In some embodiments, the one or more criteria relate to a condition number of a matrix of the system model. In some embodiments, discarding a portion of the initial guesses based on one or more criteria includes determining that a first initial guess and a second initial guess lead toward a same local optimum after the first group of iterations and, in response, discarding the first initial guess. Many other criteria are contemplated by the present disclosure.

At step 1412, a remaining initial guess is selected and the optimization problem is run for the selected initial guess for a second group of iterations and/or to local optimality. The remaining initial guess may be selected as the initial guess corresponding to the lowest value of the of the prediction error function after the first group of iterations. The second group of iterations may include a large number of iterations (e.g., a larger number of iterations than included in the first group of iterations of step 1408). It should be understood that, in some cases, local optimality is also global optimality.

At step 1414, the parameters resulting from step 1412 and/or the system model having the parameters resulting from step 1412 are checked against one or more conditions. For example, the one or more conditions may require one or more matrices of the system model to be observable, controllable, and stable. As another example, the one or more conditions may require one or more matrices of the system model to have a condition number less than a threshold condition number. As another example, the one or more conditions may require that the parameters are consistent with one or more physical laws that constrain the behavior of the system.

If the resulting parameters do not satisfy the one or more conditions, process 1400 returns to step 1412 where a different remaining initial guess is selected and the optimization problem is run for the different remaining initial guess for the second group of iterations or to local optimality. The resulting parameters and/or system model is then checked against the one or more conditions at step 1414. Steps 1412 and 1414 may be repeated until the one or more conditions are satisfied.

If the one or more conditions are determined to be satisfied at step 1414, the system model is identified as having the parameters resulting from the latest instance of step 1412. At step 1418, building equipment (e.g., HVAC equipment 210) is operated by applying the system model in a predictive controller. The controller may use the system model to generate control inputs for the building equipment, for example to minimize the utility cost associated with operating the building equipment over an optimization period. The predictive controller may be a model predictive controller or another type of controller in various embodiments. Process 1400 thereby provides for improved operation of building equipment with the improved performance described with reference to the experimental results of FIGS. 12-13.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system comprising:
   building equipment operable to heat or cool a building and generate training data relating to behavior of a building system; and
   a controller configured to perform a system identification process to identify one or more parameters of a system model that predicts the behavior of the building system, the one or more parameters comprising at least one of one or more model parameters or one or more Kalman gain parameters, the system identification process comprising:
      generating a prediction error function based on the training data and the system model;
      generating a plurality of initial guesses of the one or more parameters;
      for each initial guess, running an optimization problem of the prediction error function for a first group of iterations;
      after the first group of iterations, discarding a portion of the initial guesses based on one or more criteria and ranking a remaining portion of the initial guesses;
      running the optimization problem of the prediction error function for a top-ranked initial guess of the remaining portion to local optimality or for a second group of iterations to identify a first set of values of the one or more parameters;
      determining whether the first set of values of the one or more parameters satisfies a condition; and
      in response to a determination that the first set of values satisfies the condition, identifying the one or more parameters as having the first set of values;
   wherein the controller is configured to operate the building equipment to heat or cool the building by performing a predictive control process that uses the system model with the one or more parameters identified by the system identification process.

2. The building management system of claim 1, wherein the controller is further configured to, in response to determining that the first set of values does not satisfy the condition:
   discard the top-ranked initial guess;
   run the optimization problem for a new top-ranked initial guess to local optimality or for the second group of iterations to identify a second set of values of the one or more parameters;
   determine whether the second set of values satisfies the condition; and
   in response to a determination that the second set of values satisfies the condition, select the second set of values for the one or more parameters.

3. The building management system of claim 1, wherein the controller is configured to discard initial guesses that violate physical laws relating to the one or more parameters.

4. The building management system of claim 3, wherein determining that the first set of values satisfies the condition comprises determining that the first set of values conforms with the physical laws relating to the one or more parameters.

5. The building management system of claim 1, wherein the controller is configured to discard the portion of the initial guesses based on one or more criteria by determining that a first initial guess and a second initial guess lead toward a same local optimum after the first group of iterations and, in response, discarding the first initial guess.

6. The building management system of claim 1, wherein the controller is configured to discard the portion of the initial guesses based on one or more criteria by discarding initial guesses that lead to an unstable, uncontrollable, or unobservable system after the first group of iterations.

7. The building management system of claim 1, wherein the controller is configured to discard the portion of the initial guesses based on one or more criteria by discarding initial guesses that lead to a matrix with a condition number greater than a threshold number.

8. The building management system of claim 1, wherein each of the plurality of initial guesses provides a stable system.

9. The building management system of claim 1, wherein the controller is configured to detect and remove saturation data from the training data.

10. The building management system of claim 1, wherein the prediction error function comprises a multi-step ahead prediction error function.

11. A method for generating a system model for a building system and controlling building equipment in accordance with the system model, comprising:
   operating the building equipment to generate training data relating to behavior of the building system;
   defining a prediction error function based on the training data and the system model;
   identifying values for one or more parameters of the system model by optimizing the prediction error function, wherein optimizing the prediction error function comprises:
      generating a plurality of initial guesses of the one or more parameters;
      for each initial guess, running an optimization problem of the prediction error function for a first group of iterations;
      after the first group of iterations, discarding a portion of the initial guesses based on one or more criteria and ranking a remaining portion of the initial guesses;
      running the optimization problem of the prediction error function for a top-ranked initial guess of the remaining portion to local optimality or for a second group of iterations to identify a first set of values of the one or more parameters;
      determining whether the first set of values of the one or more parameters satisfies a condition; and
      in response to a determination that the first set of values satisfies the condition, defining the one or more parameters as having the first set of values; and
   operating the building equipment to heat or cool the building system by applying the system model in a predictive controller to generate control inputs for the building equipment.

12. The method of claim 11, further comprising, in response to determining that the first set of values does not satisfy the condition:
   discarding the top-ranked initial guess;
   running the optimization problem of the prediction error function for a new top-ranked initial guess to local optimality or for the second group of iterations to identify a second set of values of the one or more parameters;
   determining whether the second set of values satisfies the condition; and
   in response to a determination that the second set of values satisfies the condition, selecting the second set of values for the one or more parameters.

13. The method of claim 11, comprising discarding initial guesses that violate physical laws relating to the one or more parameters and the behavior of the building system.

14. The method of claim 13, wherein determining that the first set of values satisfies the condition comprises determining that the first set of values conforms with the physical laws.

15. The method of claim 11, wherein discarding the portion of the initial guesses based on one or more criteria comprises determining that a first initial guess and a second initial guess lead toward a same local optimum after the first group of iterations and, in response, discarding the first initial guess.

16. The method of claim 11, wherein discarding the portion of the initial guesses based on one or more criteria comprises discarding initial guesses that lead to an unstable, uncontrollable, or unobservable system after the first group of iterations.

17. The method of claim 11, wherein discarding the portion of the initial guesses based on one or more criteria comprises discarding initial guesses that lead to a matrix with a condition number greater than a threshold number after the first group of iterations.

18. The method of claim 11, wherein each of the plurality of initial guesses provides a stable system.

19. The method of claim 11, comprising detecting and removing saturation data from the training data.

20. A method for generating a system model for a building system and controlling building equipment in accordance with the system model, comprising:
   operating the building equipment to generate training data relating to behavior of the building system;
   defining a prediction error function based on the training data and the system model;
   identifying values for one or more parameters of the system model based on the prediction error function by:
      generating a plurality of initial guesses of the one or more parameters;
      for each initial guess, performing a first group of iterations using the prediction error function;
      after the first group of iterations, discarding a portion of the initial guesses based on one or more criteria and ranking a remaining portion of the initial guesses;
      performing a second group of iterations using the prediction error function for a top-ranked initial guess of the remaining portion to identify a first set of values of the one or more parameters;
      determining whether the first set of values of the one or more parameters satisfies a condition; and
      in response to a determination that the first set of values satisfies the condition, defining the one or more parameters as having the first set of values; and
   operating the building equipment to heat or cool the building system by applying the system model in a predictive controller to generate control inputs for the building equipment.

* * * * *